US012248808B2

(12) United States Patent
Riesen et al.

(10) Patent No.: US 12,248,808 B2
(45) Date of Patent: Mar. 11, 2025

(54) METHODS AND APPARATUS FOR TASK RELOCATION BASED ON MEMORY ACCESS PATTERNS

(71) Applicant: Intel Corporation, Santa Clara, CA (US)

(72) Inventors: Rolf Riesen, Forest Grove, OR (US); Robert Wisniewski, Ossining, NY (US); Rajesh Poornachandran, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 737 days.

(21) Appl. No.: 17/359,504

(22) Filed: Jun. 26, 2021

(65) Prior Publication Data

US 2021/0326171 A1 Oct. 21, 2021

(51) Int. Cl.
*G06F 9/48* (2006.01)
*G06F 9/30* (2018.01)
*G06F 9/32* (2018.01)
*G06F 9/50* (2006.01)
*G06N 20/00* (2019.01)

(52) U.S. Cl.
CPC ........ *G06F 9/4856* (2013.01); *G06F 9/30101* (2013.01); *G06F 9/321* (2013.01); *G06F 9/5038* (2013.01); *G06N 20/00* (2019.01)

(58) Field of Classification Search
None
See application file for complete search history.

(56) References Cited

U.S. PATENT DOCUMENTS

| 10,133,602 | B2* | 11/2018 | Harris | G06F 9/5027 |
| 2014/0007114 | A1* | 1/2014 | Wang | G06F 3/0653 |
| | | | | 718/102 |
| 2016/0239074 | A1* | 8/2016 | Lee | G06F 1/3275 |
| 2019/0034239 | A1* | 1/2019 | Cai | G06F 11/3409 |

OTHER PUBLICATIONS

Gaud et al., "Challenges of Memory Management on Modern Numa Systems," Association for Computing Machinery, ACMQUEUE, vol. 13, Issue 8, Sep.-Oct. 2015, pp. 99-124, 26 pages.

* cited by examiner

*Primary Examiner* — Eric C Wai
(74) *Attorney, Agent, or Firm* — HANLEY, FLIGHT & ZIMMERMAN, LLC

(57) ABSTRACT

Methods, apparatus, systems, and articles of manufacture are disclosed to relocate a compute thread, the apparatus comprising control circuitry to maintain a location of a plurality of domain access counters associated with a plurality of compute-memory domains for a first compute thread, and an execution monitor to set a first domain access counter of the plurality of domain access counters, the first domain access counter associated with a first compute-memory domain of the compute-memory domains, and relocate the first compute thread to a second compute-memory domain of the compute-memory domains in response to a comparison between a second domain access counter associated with the second compute-memory domain and the first domain access counter.

19 Claims, 14 Drawing Sheets

| | EPOCH 1 | EPOCH 2 | EPOCH 3 | EPOCH 4 | EPOCH 5 |
|---|---|---|---|---|---|
| COMPUTE-MEMORY DOMAIN 0 | 25 MEMORY ACCESSES | 72 MA | 27 MA | ...MA | ...MA |
| COMPUTE-MEMORY DOMAIN 1 | 57 MEMORY ACCESSES | 33 MA | 65 MA | ...MA | ...MA |
| COMPUTE-MEMORY DOMAIN 2 | ...MEMORY ACCESSES | ...MA | ...MA | ...MA | ...MA |
| COMPUTE-MEMORY DOMAIN 3 | ...MEMORY ACCESSES | ...MA | ...MA | ...MA | ...MA |

METHODS AND APPARATUS FOR TASK RELOCATION BASED ON MEMORY ACCESS PATTERNS

STATEMENT REGARDING FEDERALLY SPONSORED RESEARCH AND DEVELOPMENT

This invention was made with Government support under Agreement No. 8F-30005, awarded by DOE. The Government has certain rights in this invention.

FIELD OF THE DISCLOSURE

This disclosure relates generally to computational systems, and, more particularly, to methods and apparatus for task relocation based on memory access patterns.

BACKGROUND

Operating systems with demand-paged algorithms move data to a central processing unit (CPU) core executing a computation. A "first touch" policy in high performance computing (HPC) delays memory page allocation until a first time data is accessed. The "first touch" policy helps move the data to the compute thread (e.g., a same socket where the compute thread is executed, a same non-uniform memory access (NUMA) domain where the compute thread is executed, memory location where the compute thread is executed) that is likely to access the data.

Figure 1:
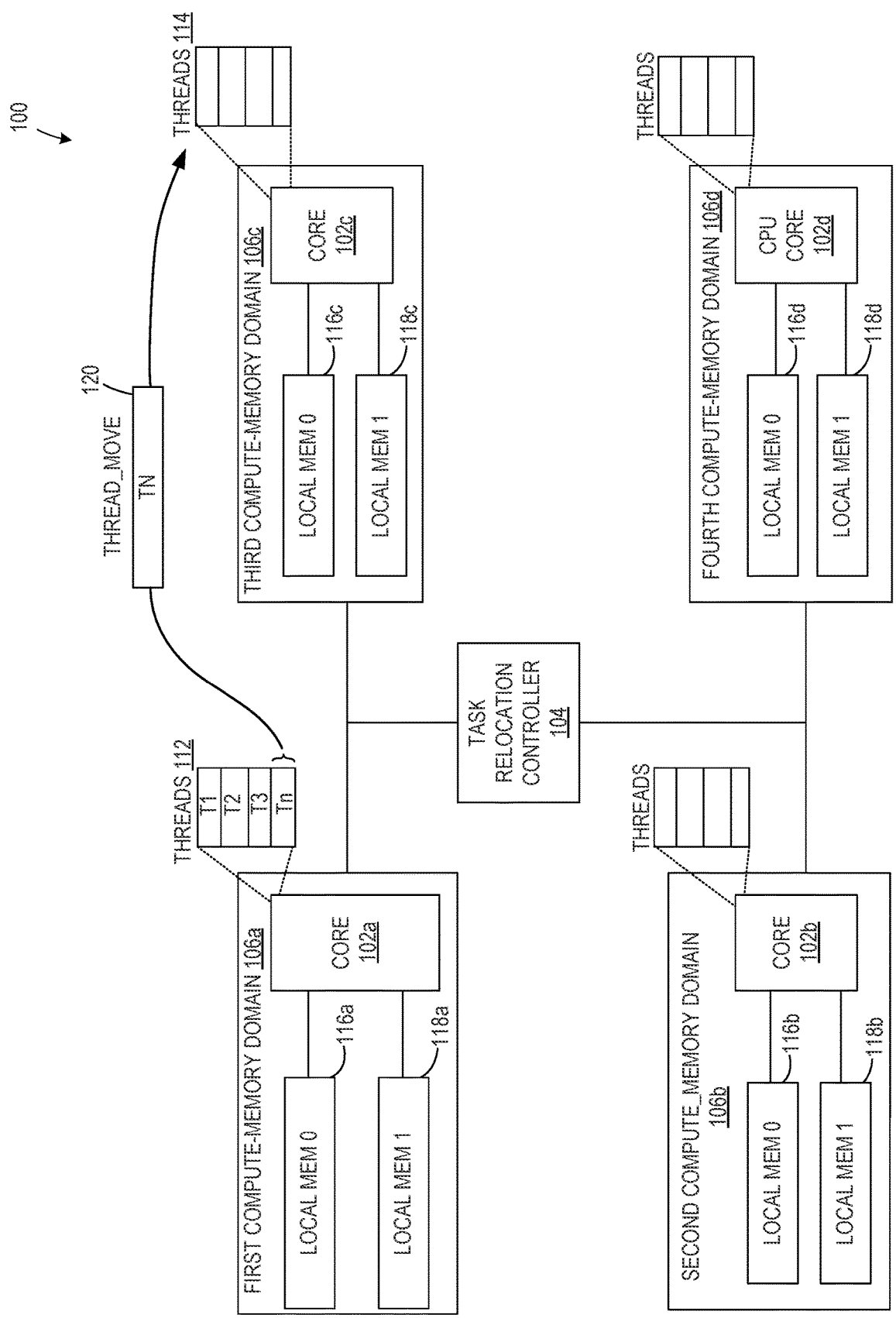
FIG. 1 is a system diagram of an example high performance computer with multiple cores.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Prior computer architectures move data to CPUs for processing in multi-core CPUs. The Data Center of the Future (DCoF) architecture relies on multi-core CPUs. Memory bandwidth and latency are improving, but at a slower rate than the computation power of a CPU, which is sometimes the reason for employing mircoservers. In the present day, data sets are much larger and compute engines are ubiquitous. In some examples, multiple threads (e.g., tasks) in different locations may need to access data during different phases of a complex program. Examples disclosed herein may be used to leave data in place, while moving compute threads (e.g., compute tasks) that access the data to a computation core that is near the memory where the data resides.

A prior approach to monitor memory accesses is called page faulting. Page faulting includes marking memory pages as inaccessible, such that when a compute thread (e.g., a compute task) requests access, a page fault occurs, which invokes intervention by the operating system. The operating system can record the event, then make the page accessible, and the compute task can continue. At least one problem with page faulting is that marking pages as inaccessible and by letting compute threads fault are expensive operations that impact performance. As used herein, an expensive operation is one that consumes a significant amount of compute resources, typically above a threshold amount of resources. In addition, finding the right (e.g., correct, suitable, most efficient) pages to mark and how often to mark pages is application dependent and, in some examples, results in worse performance.

A second prior approach to monitor memory accesses is called snapshotting. Snapshotting takes snapshots of existing memory counters when a task (e.g., a thread) is granted CPU time and when a time quantum of the task expires. At least one problem with snapshotting is that prior memory access counters are not fine-grained (e.g., detailed, specific) to a level that results in a performance boost. In addition, prior memory access counters count all memory accesses, and the operating system kernel cannot easily determine which task in the system initiated these accesses. As such, it is impossible to determine the memory accesses of an individual thread.

Traditionally, moving the data from the memory locations to the CPU where the compute threads operate is an expensive operation, and is slowed down by the memory bandwidth of the bus. Unlike prior techniques, examples disclosed herein, for a shared memory and a shared processor system, operate to move the compute threads (e.g., compute tasks) to the compute-memory domains in which memory is located that the compute threads are accessing.

FIG. 1 is a block diagram of an example multi-core central processing unit (CPU) 100 including multiple processing cores 102a, 102b, 102c, 102d in corresponding compute-memory domains 106a, 106b, 106c, 106d. The example multi-core CPU 100 also includes an example task relocation controller 104. In examples disclosed herein, a core (e.g., the cores 102a-d) is an individual processing unit, implemented by electronic circuitry, that can operate in parallel with other cores to execute instructions in a CPU (e.g., the multi-core CPU 100). In the example of FIG. 1, an example first compute-memory domain 106a includes a first core 102a, local memory (0) 116a and local memory (1) 118a. An example second compute-memory domain 106b includes a second core 102b, local memory (0) 116b, and local memory (1) 118b. An example third compute-memory domain 106c includes a third core 102c, local memory (0) 116c, and local memory (1) 118c. An example fourth compute-memory domain 106d includes a fourth core 102d, local memory (0) 116d, and local memory (1) 118d. The example local memories 116a-d and 118a-d may be implemented using static random access memory (SRAM), dynamic random access memory (DRAM), synchronous DRAM (SDRAM), embedded DRAM (eDRAM), flash memory, and/or any other suitable type of memory.

The example multi-core CPU 100 is a multi-threading processor. In the illustrated example of FIG. 1, the example compute-memory domains 106a-d operate in substantially similar manners. As such, examples disclosed herein described in connection with one of the compute-memory domains 106a-d and/or components thereof apply to any of the other compute-memory domains 106a-d. As used herein, a compute-memory domain (e.g., the compute-memory domains 106a-d) includes a core and local memory. In examples disclosed herein, a compute-memory domain (e.g., the compute-memory domains 106a-d) is an area on a silicon substrate of a CPU (e.g., the multi-core CPU 100) that includes its own intra-domain bus interconnecting a respective core (e.g., one of the cores 102a-d) to corresponding local memory (e.g., the local memories 116a-d and 118a-d) such that a core accessing its local memory via an intra-domain bus in its compute-memory domain incurs a lower memory latency than a core accessing memory of another compute-memory domain via an inter-domain bus. In some examples, a compute-memory domain may be implemented by a non-uniform memory access (NUMA) domain. In some examples, a compute-memory domain may be implemented by memory in circuit with an accelerator, pooled memory in circuit with a peripheral component interconnect (PCI) bus, or a NUMA domain. Although the example multi-core CPU 100 of FIG. 1 is described as having four compute-memory domains and four cores, examples disclosed herein may be used with multi-core CPUs having fewer or more compute-memory domains and/or fewer or more cores.

The example task relocation controller 104 includes circuitry utilized to relocate one or more compute threads 120 (e.g., compute tasks) from a first plurality of compute threads 112 to a compute-memory domain that stores data to be accessed by the one or more relocated compute threads 120. For example, if the one or more compute threads 120 in the example first compute-memory domain 106a frequently access the memory 116c, 118c of the example third compute-memory domain 106c, the example task relocation controller 104 determines that the one or more compute threads 120 should be moved to the example third compute-memory domain 106c. In the illustrated example, the one or more compute threads 120 are relocated from the compute threads 112 of the first compute-memory domain 106a to the compute threads 114 of the third compute-memory domain 106c. In examples disclosed herein, a memory access by a compute thread occurs when the compute thread issues a load instruction to read data from memory or a store instruction to write data to memory.

Figure 2:
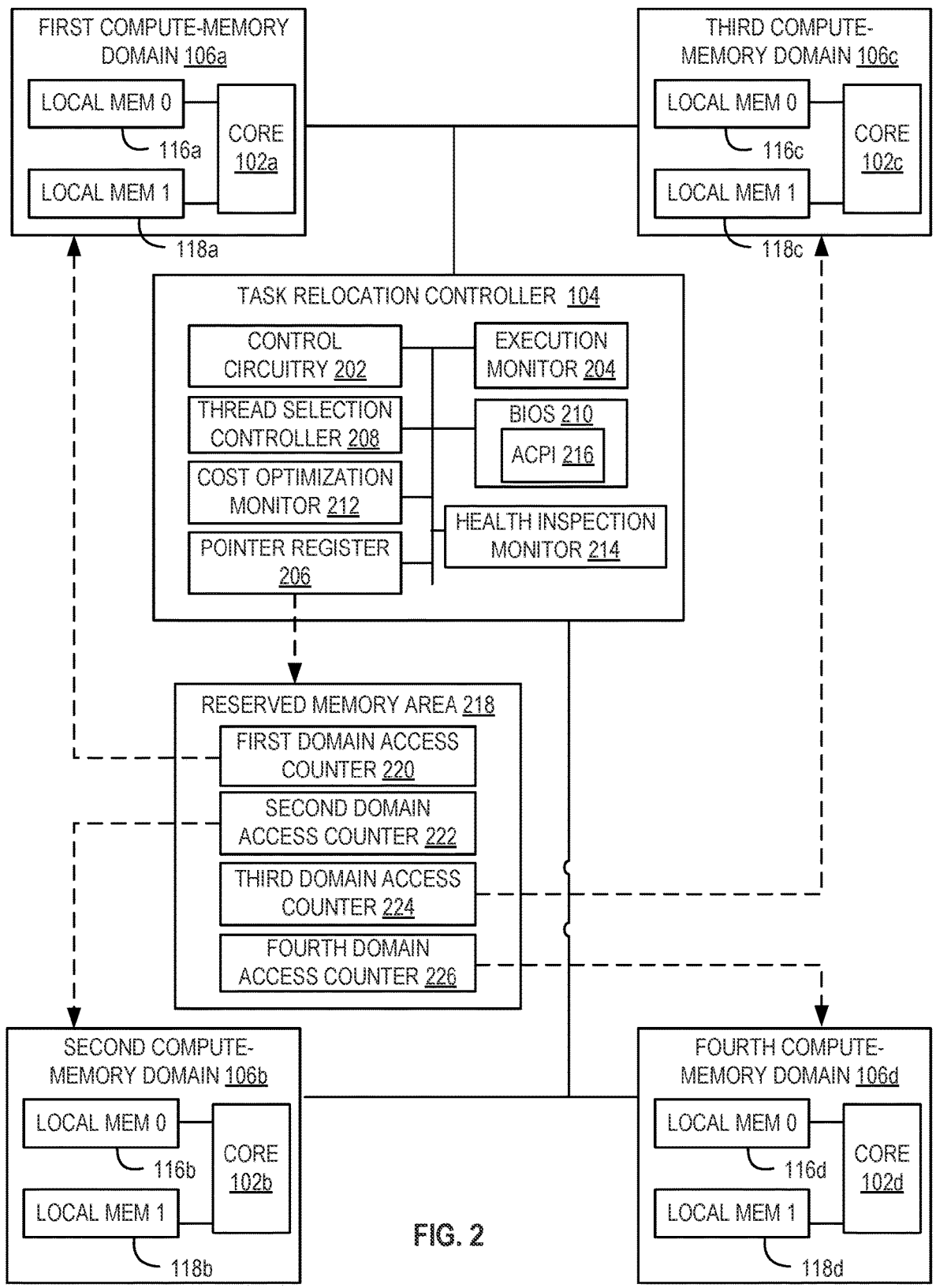
FIG. 2 is a block diagram of an example task relocation controller of FIG. 1 to relocate tasks based on memory access patterns.

FIG. 2 is a block diagram of the example task relocation controller 104 (FIG. 1) in circuit with the example compute-domains 106a-d of FIG. 1 and an example reserved memory area 218. The example reserved memory area 218 includes domain access counters 220, 222, 224, 226. In examples disclosed herein, the domain access counters 220, 222, 224, 226 correspond to one compute thread (e.g., a monitored compute thread such as the relocated compute thread 120 of FIG. 1) and are initialized to count memory accesses by that compute thread to different ones of the compute-memory domains 106a-d. For example, a first domain access counter 220 is to count (e.g., record, track) the number of times that a monitored compute thread accesses the local memories 116a, 118a of the example first compute-memory domain 106a. An example second domain access counter 222 is to count the number of times that the same monitored compute thread accesses the local memories 116b, 118b of the example second compute-memory domain 106b. An example third domain access counter 224 is to count the number of times that the same monitored compute thread accesses the local memories 116c, 118c of the example third compute-memory domain 106c. An example fourth domain access counter 226 is to count the number of times that the same monitored compute thread accesses the local memories 116d, 118d of the example fourth compute-memory domain 106d.

The example task relocation controller 104 includes example control circuitry 202, an example execution monitor 204, an example pointer register 206, an example thread selection controller 208, an example Basic Input/Output System (BIOS) 210, an example cost optimization monitor 212, and an example health inspection monitor 214.

The example control circuitry 202 is to write or load address values in the example pointer register 206. The address values correspond to locations in the example reserved memory area 218 that store domain access counters (e.g., the domain access counters 220, 222, 224, 226) for monitored compute threads. In some examples, the example control circuitry 202 is to maintain a location of a plurality of domain access counters associated with a plurality of compute-memory domains for a first compute thread. In some examples, the plurality of domain access counters may be maintained in a first reserved memory area 218. In some examples, the plurality of domain access counters may be maintained in a register.

The example execution monitor 204 is to monitor the operations of compute threads (e.g., the compute threads 112, 114, 120 of FIG. 1) and the compute-memory domains (e.g., the compute-memory domains 106a-d of FIG. 1) containing data accessed by the compute threads. The example execution monitor 204 is to set (e.g., update, increment) count values in the example domain access counters 220, 222, 224, 226. For example, when the example execution monitor 204 detects that a compute thread of interest accesses local memory 116a, 118a of the example first compute-memory domain 106a, the example execution monitor 204 sets (e.g., updates, increments) count values in the example first domain access counter 220. In some examples, when the example execution monitor 204 detects that a compute thread of interest accesses local memory 116a, 118a of the example first compute-memory domain 106a twice, the example execution monitor 204 may set the example first domain access counter 220 at a value of two (2).

In examples disclosed herein, the example domain access counters 220, 222, 224, 226 count memory accesses of a corresponding compute thread accessing memory locations in ones of the compute-memory domains 106a-d. For example, the execution monitor 204 may initialize the first domain access counter 220 as corresponding to the first compute-memory domain 106a for a particular compute thread, the second domain access counter 222 as corresponding to the second compute-memory domain 106b for the same compute thread, the third domain access counter 224 as corresponding to the third compute-memory domain 106c for the same compute thread, and the fourth domain access counter 226 as corresponding to the fourth compute-memory domain 106d for the same compute thread. In such examples, the execution monitor 204 sets (e.g., updates, increments) the count value of the first domain access counter 220 when the compute thread accesses any memory location in the first compute-memory domain 106a, the execution monitor 204 sets (e.g., updates, increments) the count value of the second domain access counter 222 when the compute thread accesses any memory location in the second compute-memory domain 106b, the execution monitor 204 sets (e.g., updates, increments) the count value of the third domain access counter 224 when the compute thread accesses any memory location in the third compute-memory domain 106c, and the execution monitor 204 sets (e.g., updates, increments) the count value of the fourth domain access counter 226 when the compute thread accesses any memory location in the fourth compute-memory domain 106d. Setting (e.g., updating, incrementing) the domain access counters 220, 222, 224, 226 allows the execution monitor 204 to compare the count values of the domain access counters 220, 222, 224, 226 to one another to identify the highest count value. The execution monitor 204 can then determine that one of the compute-memory domains 106a-d corresponding to the counter 220, 222, 224, 226 with the highest count value is the compute-memory domain 106a-d to which the compute thread should be moved to achieve the biggest benefit in reducing memory access latency based on most memory accesses by that thread being to memory locations in that identified one of the compute-memory domains 106a-d.

The example execution monitor 204 is to relocate compute threads to different compute-memory domains 106a-d in response to determining that counters corresponding to those compute threads indicate the compute threads are accessing data in memory locations of compute-memory domains 106a-d different than the compute-memory domains 106a-d in which those threads are executing. As used herein, a compute thread is used by a core 102a-d to execute corresponding computer readable instruction(s) as a process. In examples disclosed herein, a compute thread is relocated from one compute-memory domain to another compute-memory domain by moving the associated instruction(s) of that thread from an instruction buffer of one of the cores 102a-d to an instruction buffer of another one of the cores 102a-d. For example, the execution monitor 204 may relocate the compute thread 120 (FIG. 1) from the example first compute-memory domain 106a to the example second compute-memory domain 106b. For example, to determine whether the compute thread 120 of FIG. 1 should be moved from the first compute-memory domain 106a to the second compute-memory domain 106b, the example execution monitor 204 compares the example first domain access counter 220 which corresponds to memory accesses performed by the compute thread to the local memory 116a, 118a of the first compute-memory domain 106a with the example second domain access counter 222 which corresponds to memory accesses performed by the compute thread to the local memory 116b, 118b of the second compute-memory domain 106b. If a value of the first domain access counter 220 indicates three (3) memory accesses by the compute thread 120 for the example first compute-memory domain 106a, and a value of the example second domain access counter 222 indicates six (6) memory accesses by the compute thread 120 for the example second compute-memory domain 106b, the example execution monitor 204 determines that the compute thread 120 should execute in the second compute-memory domain 106b. As such, if the compute thread 120 is being executed by the core 102a of the first compute-memory domain 106a, the example execution monitor 204 relocates the compute thread 120 from the first compute-memory domain 106a to the second compute-memory domain 106b. Alternatively, if the compute thread 120 was already being executed by the core 102*b* of the second compute-memory domain 106*b* when the comparison of the domain access counters 220, 222 was performed, the example execution monitor 204 determines that it should not move the compute thread 120 so that the compute thread 120 can continue to be executed by the core 102*b* in the second compute-memory domain 106*b* because it contains memory locations of the local memory 116*b*, 118*b* found to be the most frequently accessed memory locations by the compute thread 120. In some examples, the example execution monitor 204 may access the domain access counters 220, 222, 224, 226 from time to time (e.g., even after the corresponding compute thread has been moved between compute-memory domains) to determine if the compute thread 120 is still being executed in the example compute-memory domain that is most frequently accessed. The example execution monitor 204 may perform the determination at context switch time, on interrupt, or in response to a trigger from the example task relocation controller 104. In some examples, the example domain access counters 220, 222, 224, 226 reside in memory (e.g., reserved memory area 218, internal memory of the multi-core CPU 100 of FIG. 1). The example execution monitor 204 may read (e.g., access, view) and/or reset the example domain access counters 220, 222, 224, 226. For example, the execution monitor 204 may reset the domain access counters 220, 222, 224, 226 after evaluation of a compute thread is completed and/or after a compute thread has been moved between compute-memory domains. In this manner, the example execution monitor 204 may restart an evaluation of a compute thread without previous accumulated count values creating a bias toward one or more compute-memory domains that is not accurately representative of the most recent memory access activities of that compute thread across the compute-memory domains.

To access the example domain access counters 220, 222, 224, 226, the example control circuitry 202 loads a starting memory address of the domain access counters 220, 222, 224, 226 in the example pointer register 206. The memory addresses of the domain access counters 220, 222, 224, 226 may be reserved memory areas in the example reserved memory area 218. The value of the pointer register 206 is part of a process context and different starting memory addresses of different sets of domain access counters may be swapped in and out of the example pointer register 206 when different corresponding compute threads become runnable or lose their time quantum (e.g., a time slice during which a core executes a compute thread). For example, each compute thread to be monitored is associated with a corresponding set of domain access counters. As such, the reserved memory area 218 can store multiple sets of domain access counters for different compute threads. When a core 102*a-d* finishes or pauses execution of a first monitored compute thread and is to begin monitoring a second compute thread, the example control circuitry 202 saves the memory address of the domain access counters for the first compute thread from the pointer register 206 to a process context of that first compute thread, and loads another memory address of the domain access counters for the second compute thread to be executed form a saved process context of the second compute thread into the pointer register 206. In this manner, the task relocation controller 104 can use the memory address in the pointer register 206 to access the domain access counters and track memory accesses to different ones of the compute-memory domains 106*a-d* during execution of the second compute thread by incrementing count values in those domain access counters. The example pointer register 206 may be implemented in hardware. For example, the example pointer register 206 may be silicon on a substrate.

The example thread selection controller 208 is to determine compute threads of interest. For example, there may be hundreds of threads running different processes such as computer administration processes or non-HPC processes. As used herein, a compute thread of interest is a compute thread to be monitored by the example execution monitor 204 using the example domain access counters 220, 222, 224, 226. In some examples, the example thread selection controller 208 selects a first compute thread from a plurality of compute threads based on memory accesses by the first compute thread satisfying a threshold amount of memory and/or a threshold amount of memory accesses. For example, the thread selection controller 208 may use a threshold value set to one (1) gigabyte such that a thread that accesses over one (1) gigabyte of data is selected by the thread selection controller 208 as a compute threads of interest. In some examples, the example thread selection controller 208 selects a compute thread of interest based on a High Performance Computing (HPC) status of the thread. For example, if the example thread selection controller 208 determines a compute thread is an HPC thread, the example thread selection controller 208 may select the compute thread as a compute thread of interest. For example, some HPC tasks (e.g., machine learning algorithms, etc.) rapidly process gigabytes of data.

The example BIOS 210 is to discover capabilities of the compute-memory domains 106*a-d*. The example BIOS 210 includes an Advanced Configuration and Power Interface (ACPI) distance matrix 216. The example BIOS 210 determines whether to relocate compute threads based on memory access latencies specified in the ACPI distance matrix 216. For example, memory access latencies in the ACPI distance matrix 216 may represent how fast data can be accessed in local memory of the compute-memory domains 106*a-d* when accessed by compute threads executing locally in respective ones of the compute-memory domains 106*a-d*. That is, with regard to the first compute-memory domain 106*a*, the example ACPI distance matrix 216 may specify a corresponding memory access latency for accessing the local memory 116*a*, 118*a* (FIG. 1) by a compute thread executed by the core 102*a* in the first compute-memory domain 106*a*. Similarly, with regard to the second compute-memory domain 106*b*, the example ACPI distance matrix 216 may specify a corresponding memory access latency for accessing the local memory 116*b*, 118*b* (FIG. 1) by a compute thread executed by the core 102*b* in the second compute-memory domain 106*b*. In this manner, such memory access latency information may be used to determine (e.g., by the cost optimization monitor 212) whether data access speeds can be improved by moving a compute thread from one of the compute-memory domains 106*a-b* to the other. For example, if the memory access latency of the local memory 116*a*, 118*a* in the first compute-memory domain 106*a* is very low, resulting in fast data access speeds for compute threads executing in the first compute-memory domain 106*a*, and the memory access latency of the local memory 116*b*, 118*b* in the second compute-memory domain 106*b* is very high, resulting in slow data access speeds for compute threads executing in the second compute-memory domain 106*b*, a cost optimization analysis based on data access speeds/memory access latency may indicate to not move a compute thread from the first compute-memory domain 106*a* to the second compute-memory domain 106*b* because such a move would not be likely to produce a significant improvement or any improvement in data access speeds due to the high memory latencies associated with accessing the local memory 116b, 118b of the second compute-memory domain 106b. In some examples, the ACPI distance matrix 216 may additionally or alternatively record the power consumed by peripheral devices in moving compute threads from the example first compute-memory domain 106a to the example second compute-memory domain 106b. In such examples, optimization cost analyses may be used to determine based on the ACPI distance matrix 216 whether moving a compute threads is efficient in terms of power consumption. For example, such power-based cost analysis may be used to evaluate whether moving a compute thread would result in less or more power consumption and whether an increased power consumption warrants any improvement in data access speed performance.

Figures 4A, 4B:
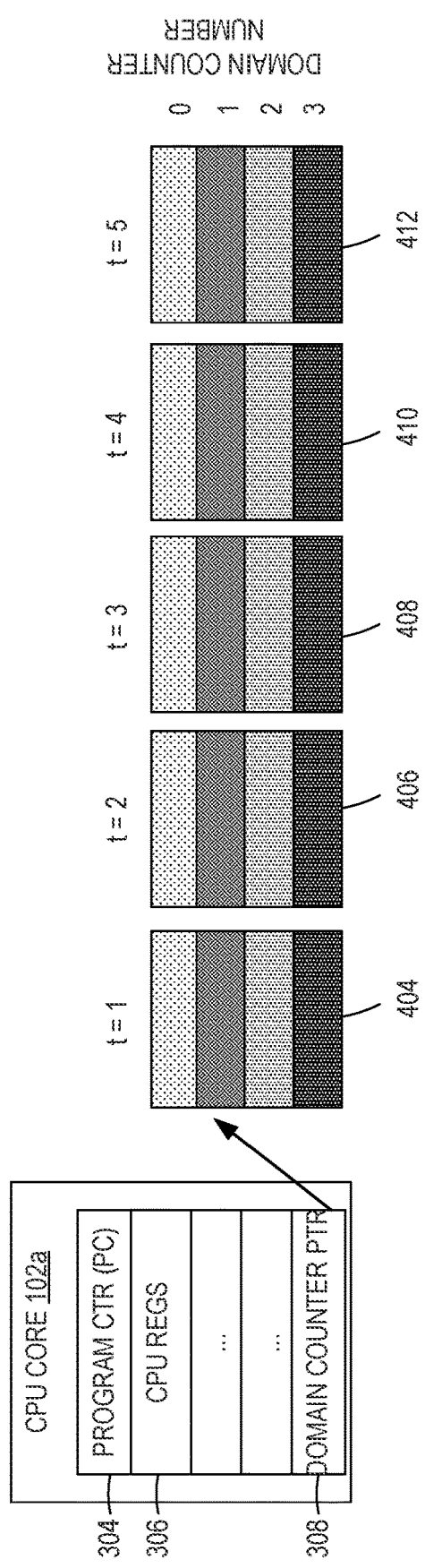
FIGS. 4A-4B illustrate an example technique implemented by the example task relocation controller of FIG. 2 to track memory access patterns.

The example cost optimization monitor 212 is to compare the cost of moving a compute thread and the benefit of moving the compute thread. For example, in order to move a compute thread from a first compute-memory domain 106a to a second compute-memory domain 106b, there may be an associated cost. Examples of costs may be power consumption, memory bandwidth, memory latency, performance time. For example, moving a compute thread may consume some amount of power that would otherwise not be consumed if the compute thread were not moved. The example cost optimization monitor 212 may determine that the benefit of moving the compute thread (e.g., faster performance time) does not outweigh the cost of moving the compute thread. In some examples, a compute thread may access the first compute-memory domain 106a at a first time, access the second compute-memory domain 106b at a second time, and access the first compute-memory domain 106a at a third time. Certain patterns of access may be observed by the example cost optimization monitor 212, which influence decisions on whether to move compute threads to different ones of the compute-memory domains 106a-d. FIG. 4A and FIG. 4B illustrate an example history or patterns of memory accesses that the cost optimization monitor 212 may use to determine whether compute threads should be moved between different ones of the compute-memory domains 106a-d. For example, if a compute thread alternates between accessing two memory locations frequently (e.g., repeatedly, according to a threshold) in correspondingly different compute-memory domains such that each of the two memory locations contributes to half of the total memory accesses, the example cost optimization monitor 212 may determine to not move the compute thread from the compute-memory domain that includes one of the memory locations to the other compute-memory domain that includes the other one of the memory locations because the alternating memory accesses between the two compute-memory domains would result in the same performance as before the compute thread was moved.

The example health inspection monitor 214 of FIG. 2 is to determine the functionality of the compute-memory domains 106a-d. For example, the health inspection monitor 214 may determine whether a faulty core of a compute-memory domain may be prone (e.g., likely) to fail and provide such health information to determine whether to move a compute thread to the compute-memory domain with the faulty core. For example, if a compute thread is located in the example second compute-memory domain 106b, but is accessing the example local memory 116a, 118a in the example first compute-memory domain 106a, the example health inspection monitor 214 may determine to not move the compute thread to the first compute-memory domain 106a if the example health inspection monitor 214 determines that the core 102a in the example first compute-memory domain 106a is faulty.

The example reserved memory area 218 is to store a plurality of counters including the example domain access counters 220, 222, 224, 226. The example reserved memory area 218 includes memory address locations pointed to by memory addresses loaded in the example pointer register 206. The example reserved memory area 218 may be a small array that is to hold one counter per compute-memory domain. Each domain access counter of a set of domain access counters (e.g., the domain access counters 220, 222, 224, 226) in the example reserved memory area 218 (e.g., a small array) may be accessed based on the starting memory address in the example pointer register 206 and indexed by the number of the compute-memory domain that is being accessed by a monitored compute thread. In some examples, the reserved memory area 218 may be implemented using a minimal amount of memory space (e.g., 64 bytes). The amount of memory space is determined based on the bit lengths of the counters and the number of counters. The number of counters is based on the number of compute-memory domains to be monitored for a monitored compute thread. In some examples, the amount of memory space (e.g., MemorySpace) needed in the reserved memory area 218 to store a set of domain access counters for a monitored compute thread may be determined using Equation 1 below.

$$\text{MemorySpace} = N*\text{sizeof(counters)} \qquad \text{Equation 1}$$

In Equation 1 above, is the number of compute-memory domains, and sizeof(counters) is the bit length of an individual domain access counter. The example domain access counters may be initialized to store integer values (e.g., INT) or values of any other data type (e.g., DoubleWord, Float, etc.). According to memory space Equation 1 above, a compute node with eight compute-memory domains and eight domain access counters that are eight bytes in length will use a memory space of 64 bytes (e.g., 64 bytes of counter memory space=8 counters*8 bytes in length) to store the eight counters in the reserved memory area 218. For the example of FIG. 2, 32 bytes of memory space is reserved in the reserved memory area 218 to store the four domain access counters 220, 222, 224, 226 if they each have a length of eight bytes. In the example of FIG. 2, the first domain access counter 220 may be accessed at the starting memory address in the example pointer register 206, and the other domain access counters 222, 224, 226 can be accessed at respective address offsets (e.g., indexed) relative to the starting memory address in the example pointer register 206. In some examples, the reserved memory area 218 is implemented on an integrated circuit substrate (e.g., silicon-die) or a logic circuit. In some examples, the amount of memory space allocated in the reserved memory area 218 for a set of domain access counters is sixty-four (64) bytes or less per compute thread to be monitored. In some examples, the pointer register 206 may be eight (8) bytes to store 64-bit addresses of memory locations of domain access counters in the reserved memory area 218. In some examples, the number of compute-memory domains is a single digit number. According to Equation 1, the amount of memory to hold counter arrays in such examples is small, such that array(s) to store the domain access counters 220, 222, 224, 226 may be stored in the reserved memory area 218 and/or may be stored (e.g., held) in the processor (e.g., core 102a). Holding the domain access counters 220, 222, 224, 226 in a processor rather than memory minimizes memory accesses, thus, increasing access speeds for the domain access counters and decreasing congestion on a memory bus to improve the performance of monitoring compute threads as disclosed herein. For example, the domain access counters 220, 222, 224, 226 may be stored in registers (e.g., the CPU registers 304, 306, 308 of FIG. 3). In some examples, the domain access counters 220, 222, 224, 226 may be stored only in the reserved memory area 218. In other examples, the domain access counters 220, 222, 224, 226 may be maintained only in the CPU registers 304, 306, 308, of FIG. 3. In yet other examples, the domain access counters may be maintained in the CPU registers 304, 306, 308 and written back to the reserved memory area 218 for longer term storage. In yet other examples, the domain access counters 220, 222, 224, 226 may be maintained in any other combination of registers and memory. For examples in which the domain access counters 220, 222, 224, 226 are stored in a processor (e.g., in registers), the count values of the counters 220, 222, 224, 226 are saved and/or restored upon task context switches when compute threads are paused and/or resumed.

Figure 3:
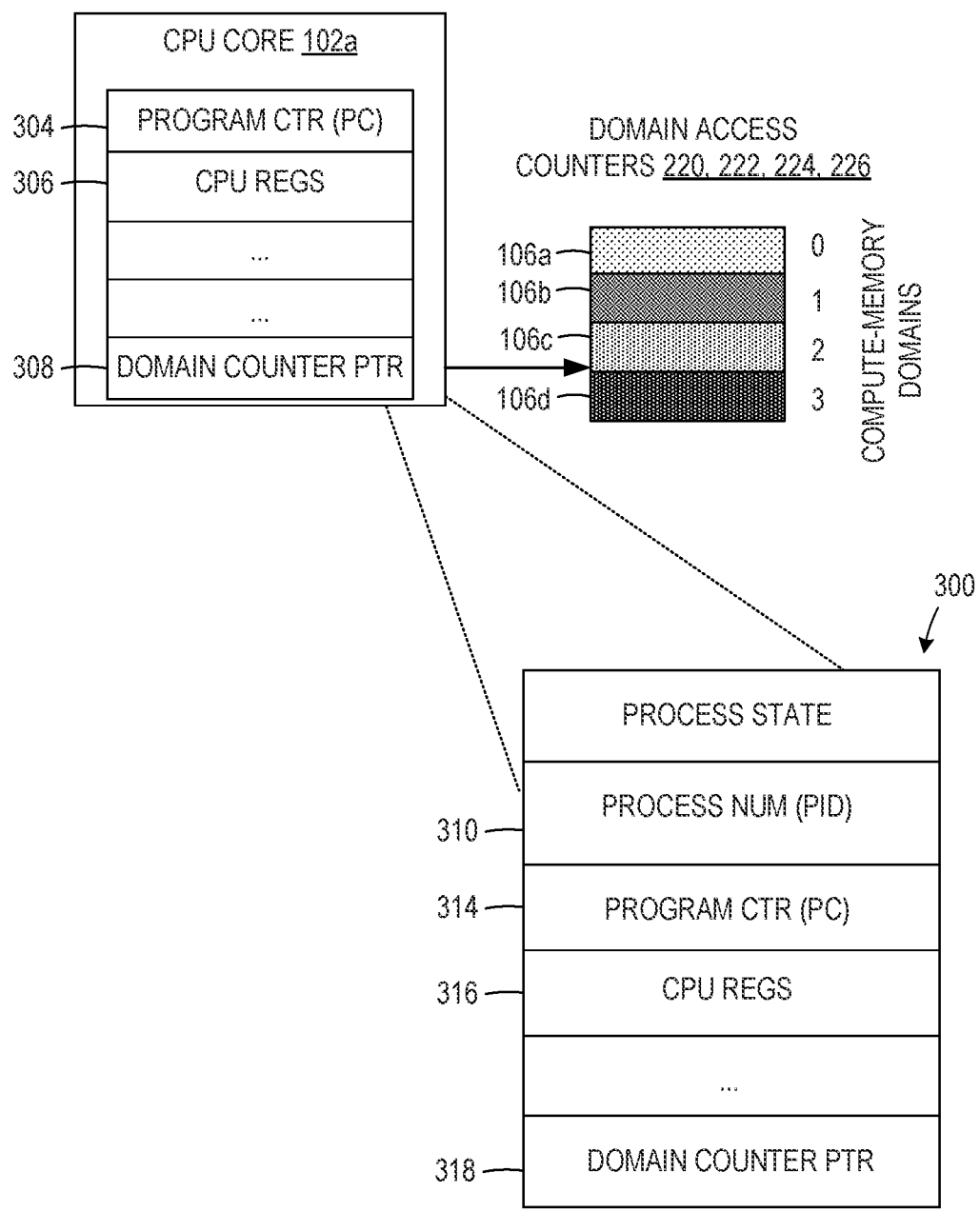
FIG. 3 illustrates example domain access counters of the example task relocation controller of FIG. 2.

FIG. 3 illustrates example registers 304, 306, 308 of the example core 102a (e.g., CPU core 102a) and a corresponding process control block (PCB) 300 representing a process state which includes values of the example registers 304, 306, 308. The example process control block 300 corresponds to a particular compute thread and may be stored in memory or maintained/loaded in a CPU. For example, the process state of the process control block 300 represents a snapshot in time of the values in the registers of the core 102a. For example, the process state of the process control block 300 includes a process number or process identifier (e.g., process num (PID)) 310 that identifies a compute thread in execution during the process state 300. The example process state of the process control block 300 includes a program counter state value 314 of an example program counter 304 (e.g., "Program CTR (PC)") to represent the address of the next instruction to be executed from memory. The example process state of the process control block 300 includes CPU register state values 316 of a plurality of CPU registers 306 (e.g., "CPU REGS"). The example process state of the process control block 300 includes a domain counter pointer 318 of a domain counter pointer register 308 (e.g., "DOMAIN COUNTER PTR"). The domain counter pointer 318 stored in the example domain counter pointer register 308 points to memory address locations of the reserved memory area 218 at which the domain access counters 220, 222, 224, 226 (FIG. 2) are stored.

FIGS. 4A-B illustrate the functionality of the example cost optimization monitor 212 of FIG. 2 to determine a history of memory accesses across various epochs of time for a first compute thread. As used herein, an epoch of time may be any length of time, but typical examples include range between a few milliseconds (e.g., scheduler timer tick interval), and five (5) minutes. In some examples, the example cost optimization monitor uses the history of memory accesses to determine to move the first compute thread to a different compute-memory domain. The example of FIG. 4A includes the domain counter pointer register 308 in the example core 102a (e.g., CPU core 102a). In the example of FIG. 4A, four domain counter values (counters 0-4) are shown for five epochs (t=1 to t=5). For example, domain counter #0 corresponds to the first domain access counter 220, domain counter #1 corresponds to the second domain access counter 222, domain counter #2 corresponds to the third domain access counter 224, and domain counter #3 corresponds to the fourth domain access counter 226. At a first time 404 (e.g., a first epoch, "t=1"), the example cost optimization monitor 212 retrieves (e.g., accesses, obtains, views, determines) the values (e.g., number of memory accesses) of the domain access counters 220, 222, 224, 226. At a second time 406 (e.g., a second epoch, "t=2"), the example cost optimization monitor 212 is to retrieve the values of the domain access counters 220, 222, 224, 226 after some time has elapsed. The example cost optimization monitor 212 retrieves the values set (e.g., updated, incremented) in the domain access counters 220, 222, 224, 226 for the third time 408, the fourth time 410, and the fifth time 412. In the example of FIG. 4A, instead of a single domain counter per compute thread (e.g., observed process) per compute-memory domain, a plurality of domain counters may be used per compute thread per compute-memory domain. The example execution monitor 204 may, in response to exhausting the plurality of domain counters, return to setting (e.g., updating, incrementing) count values in the first domain counter which provides a history of memory accesses instead of an absolute count of memory accesses. The history of memory accesses may be used to improve efficiency in relocation of compute threads.

FIG. 4B illustrates a data table (e.g., a database) which charts the history of memory accesses to different ones of the compute-memory domains 106a-d. In some examples, the data table is viewable by a human or artificial intelligence (e.g., a machine learning model or machine learning circuitry in the cost optimization monitor 212) to determine, based on the memory accesses, if a compute thread is to be moved. In some examples, the compute thread may be required to access a certain compute-memory domain above a threshold of memory accesses before the execution monitor 204 of FIG. 2 determines to move the compute thread.

In the example of FIG. 4B, for a first time 404, a compute thread accessed the example first compute-memory domain 106a twenty-five (25) times and accessed the example second compute-memory domain 106b fifty-seven (57) times. In some examples, if the compute thread is located in the example first compute-memory domain 106a, the example execution monitor 204 moves the compute thread to the example second compute-memory domain 106b which had more memory accesses. In some examples, the execution monitor 204 and the example cost optimization monitor 212 monitors the memory accesses for a predetermined number of epochs (e.g., time periods). If there is an example trend of memory accesses, such as the second compute-memory domain 106b had more memory accesses than the first compute-memory domain location 106a, the example execution monitor 204 moves the example compute thread.

If there is a history of alternating memory accesses, such as described in FIG. 4B, the example execution monitor 204 and the example cost optimization monitor 212 may determine to move the compute thread in response to the benefits and the costs of moving the compute thread. For example, there may be a power cost for moving the compute thread which offsets the gain in computing processing time by moving the compute thread to the compute-memory domain with more memory accesses (which moves the compute thread nearer to the memory locations that the compute thread is accessing). In the example second time 406, the first compute-memory domain 106a has seventy-two (72) memory accesses while the second compute-memory domain 106b has thirty-three (33) memory accesses.

If the example execution monitor 204 did not record a history of memory accesses, the example execution monitor 204 would determine that seventy-two is larger than thirty-three, and move the compute thread from the second compute-memory domain 106b to the first compute-memory domain 106a or, if the compute thread was already located in the first compute-memory domain 106a, leave the compute thread in the first compute-memory domain 106a. However, the third time 408 shows that the first compute-memory domain 106a has twenty-seven (27) memory accesses, while the second compute-memory domain 106b has sixty-five (65) memory accesses. If the example execution monitor 204 did not record a history of memory accesses, the example execution monitor 204 determines that sixty-five is larger than twenty-seven and move the compute thread from the first compute-memory domain 106a to the second compute-memory domain 106b or, if the compute thread was already located in the second compute-memory domain 106b, leave the compute thread in the second compute-memory domain 106b. However, by determining a history of compute-memory domain accesses (e.g., accesses to local memory of the compute-memory domains 106a-d), the example cost optimization monitor 212 determines to inform the example execution monitor 204 to move the compute threads based on if the compute-memory domain is consistently accessed or if the compute thread alternates between at least two compute-memory domains.

In some examples, the task relocation controller 104 includes means for maintaining a location of a plurality of domain access counters. For example, the means for maintaining a location of a plurality of domain access counters may be implemented by control circuitry 202. In some examples, the task relocation controller 104 includes means for storing a first address value in a first pointer register. In some examples, the means for storing a first address value in a first pointer register may be implemented by control circuitry 202. In some examples, the control circuitry 202 may be implemented by machine executable instructions such as that implemented by at least blocks 1002 of FIG. 10 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the control circuitry 202 is implemented by other hardware logic circuitry, hardware implemented state machines, and/or any other combination of hardware, software, and/or firmware. For example, the control circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the task relocation controller 104 includes means for setting (e.g., updating, incrementing) count values in a first domain access counter of the plurality of counters. For example, the means for setting (e.g., updating, incrementing) a count value in a first domain access counter of the plurality of counters may be implemented by the execution monitor 204. In some examples, the execution monitor 204 may be implemented by machine executable instructions such as that implemented by at least blocks 1004 of FIG. 10 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the execution monitor 204 is implemented by other hardware logic circuitry, hardware implemented state machines, and/or any other combination of hardware, software, and/or firmware. For example, the execution monitor 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the task relocation controller 104 includes means for relocating first execution thread to second compute-memory domain. For example, the means for relocating first execution thread to second compute-memory domain may be implemented by execution monitor 204. In some examples, the execution monitor 204 may be implemented by machine executable instructions such as that implemented by at least blocks 1006 of FIG. 10 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the execution monitor 204 is implemented by other hardware logic circuitry, hardware implemented state machines, and/or any other combination of hardware, software, and/or firmware. For example, the execution monitor 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing example task relocation controller 104 of FIG. 1 is illustrated in FIG. 2, one or more of the elements, processes, and/or devices illustrated in FIG. 2 may be combined, divided, re-arranged, omitted, eliminated, and/or implemented in any other way. Further, example control circuitry 202, the example execution monitor 204, the example pointer register 206, the example thread selection controller 208, the example BIOS 210, the example cost optimization monitor 212, the example health inspection monitor 214, the example ACPI distance matrix 216 and/or, more generally, the example task relocation controller 104 of FIG. 3, may be implemented by hardware, software, firmware, and/or any combination of hardware, software, and/or firmware. Thus, for example, any of the example control circuitry 202, the example execution monitor 204, the example pointer register 206, the example thread selection controller 208, the example BIOS 210, the example cost optimization monitor 212, the example health inspection monitor 214, the example ACPI distance matrix 216 and/or, more generally, the example task relocation controller 104, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example control circuitry 202, the example execution monitor 204, the example pointer register 206, the example thread selection controller 208, the example BIOS 210, the example cost optimization monitor 212, the example ACPI distance matrix 216, the example health inspection monitor 214 is/are hereby expressly defined to include a non-transitory computer readable storage device or storage disk such as a memory, a digital versatile disk (DVD), a compact disk (CD), a Blu-ray disk, etc., including the software and/or firmware. Further still, the example task relocation controller 104 of FIG. 2 may include one or more elements, processes, and/or devices in addition to, or instead of, those illustrated in FIG. 2, and/or may include more than one of any or all of the illustrated elements, processes and devices.

Flowcharts representative of example hardware logic circuitry, machine readable instructions, hardware implemented state machines, and/or any combination thereof for implementing task relocation controller 104 of FIG. 2 is shown in FIGS. 5-10. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 12 and/or 13. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 5-10, many other methods of implementing the example task relocation controller 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5-10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 5:
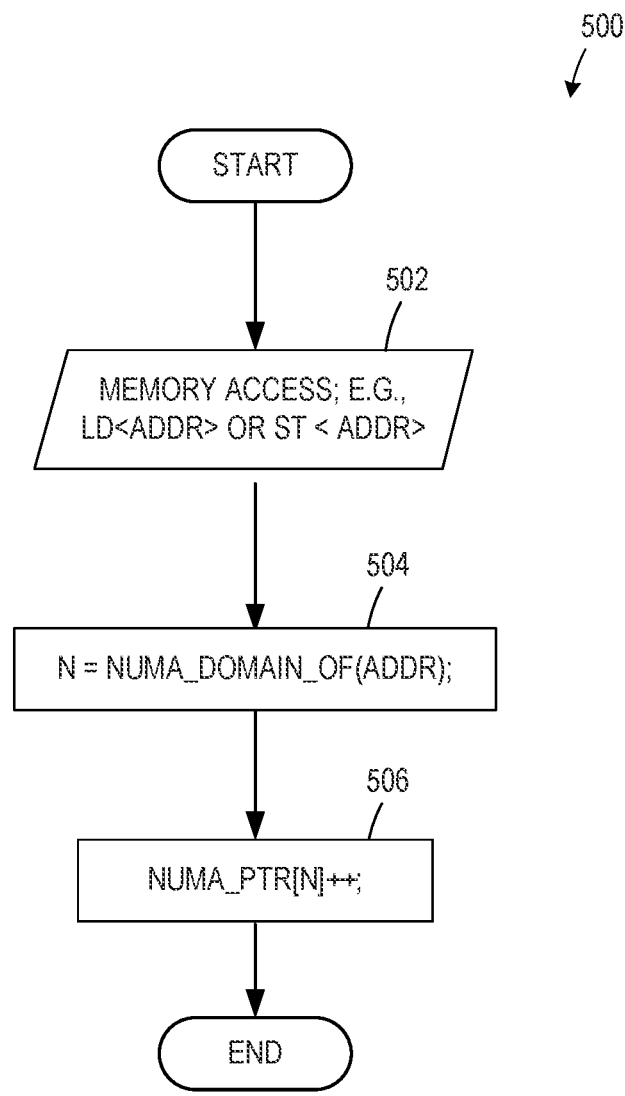
FIGS. 5-10 are flowcharts representative of example machine readable instructions that may be executed by example processor circuitry to implement the example task relocation controller of FIG. 2 to relocate tasks in accordance with teachings of this disclosure.

FIG. 5 is a flowchart representative of example machine readable instructions and/or example operations 500 that may be executed and/or instantiated by processor circuitry to cause the example task relocation controller 104 (FIGS. 1 and 2) to set (e.g., update, increment) a count value in a domain access counter (e.g., one of the domain access counters 220, 222, 224, 226 of FIG. 2) in response to an access to local memory in a compute-memory domain corresponding to that domain access counter. The example machine readable instructions and/or example operations 500 are written in example computer syntax code (e.g., Assembly). The example machine readable instructions and/or example operations 500 are written in the context of NUMA domains, but any compute-memory domain may be used. The machine readable instructions and/or operations 500 of FIG. 5 begin at block 502, at which the example execution monitor 204 monitors core execution.

At block 502, ("MEMORY ACCESS; e.g., LD <ADDR> or ST <ADDR>"), a compute thread of interest accesses a memory location. The compute thread may load (e.g., "LD") an instruction or data from a memory address ("ADDR") or store (e.g., "ST") an instruction or data to a memory address. The address of the memory location is stored in memory in response to a compute thread accessing a memory location. In the illustrated example, detection of the memory access causes the example task relocation controller 104 to determine that it is to track the memory access for the compute thread by identifying a corresponding compute-memory domain pertaining to the memory access so that the task relocation controller can increment a corresponding domain access counter.

At block 504 ("N=NUMA_DOMAIN_OF(ADDR);"), the example execution monitor 204 determines the compute-memory domain of the memory accesses. For example, the example execution monitor may use a lookup table to determine the compute-memory domain (e.g., one of the compute memory domains 106a-d) that was accessed by the example compute thread.

At block 506 ("NUMA_PTR[N]++;"), the example execution monitor 204 determines to set (e.g., update, increment) a count value in the corresponding domain access counter based on detected a memory access. For example, if the example first compute-memory domain 106a of FIGS. 1 and 2 is accessed once by a compute thread, and the example first domain access counter 220 of FIG. 2 corresponds to the example first compute-memory domain 106a of FIGS. 1 and 2, the example first domain access counter 220 of FIG. 2 is incremented by one memory access. The example instructions 500 end.

Figure 6:
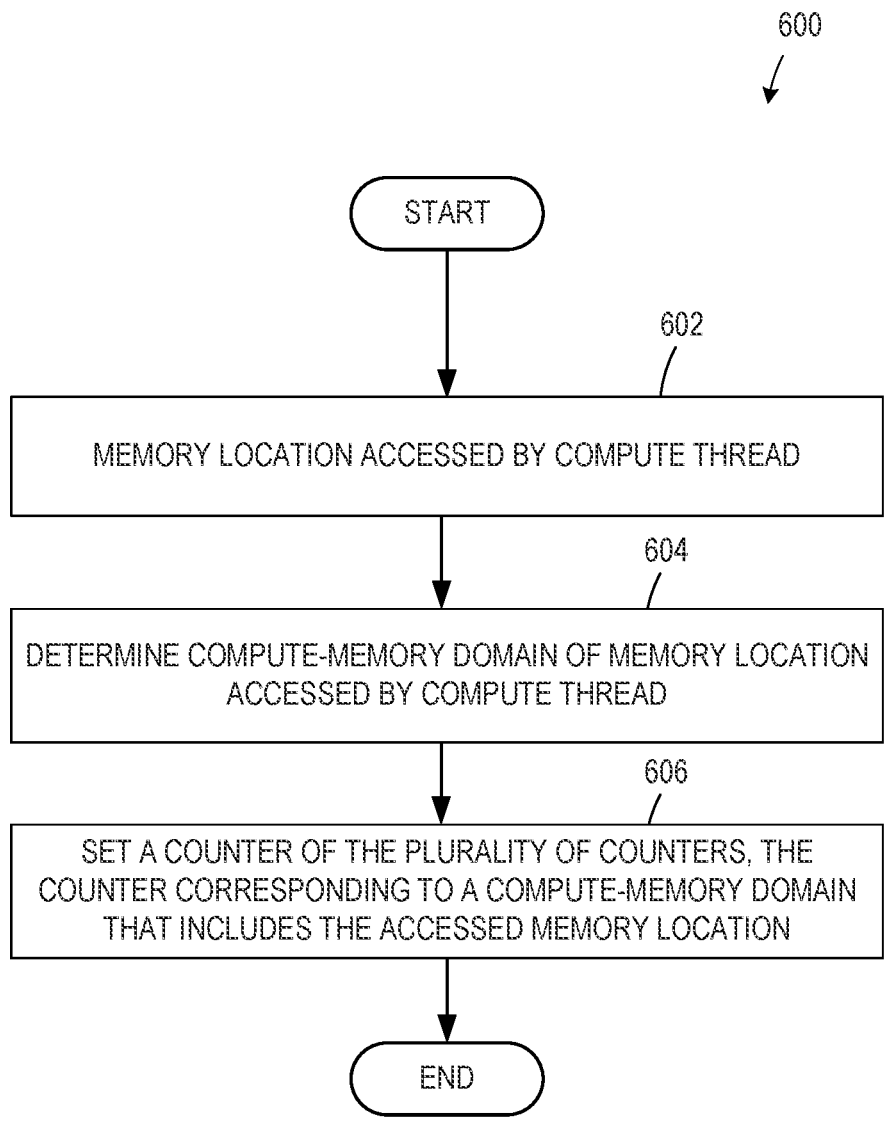

FIG. 6 is a flowchart representative of example machine readable instructions and/or example operations 600 that may be executed and/or instantiated by processor circuitry to cause the example task relocation controller 104 (FIGS. 1 and 2) to set (e.g., updated, increment) a count value in a counter in response to a compute thread accessing a memory location of a compute-memory domain. The machine readable instructions and/or operations 600 of FIG. 6 begin at block 602, at which the example execution monitor 204 (FIG. 1) detects a memory location accessed by a monitored compute thread. For example, the monitored compute thread may access the memory location by reading data from memory (e.g., one of the local memories 116a-d, 118a-d of FIGS. 1 and 2) or writing data to memory (e.g., one of the local memories 116a-d, 118a-d of FIGS. 1 and 2).

At block 604, the example execution monitor 204 determines the compute-memory domain of the memory location accessed by the compute thread. For example, the execution monitor 204 may determine that the compute thread accesses the first compute-memory domain 106a if the memory access is to any of the local memories 116a, 118a of the first compute-memory domain 106a. In some examples, the example execution monitor 204 may determine which one of the compute-memory domains 106a-d includes the memory location accessed by the compute thread by using a lookup table which includes mappings of the compute-memory domains 106a-d to memory addresses of the local memories 116a-d, 118a-d.

At block 606, the example execution monitor sets (e.g., updates, increments) a count value in a domain access counter of the domain access counters 220, 222, 224, 226. For example, the incremented domain access counter corresponds to the one of the compute-memory domains 220, 222, 224, 226 that includes the memory location accessed at block 602. For example, the example execution monitor 204 may set (e.g., update, increment) a count value in the first domain access counter 220 associated with the first compute-memory domain 106a if the accessed memory location is in one of the local memories 116a, 118a of the first compute-memory domain 106a. The example instructions 600 end.

Figure 7:
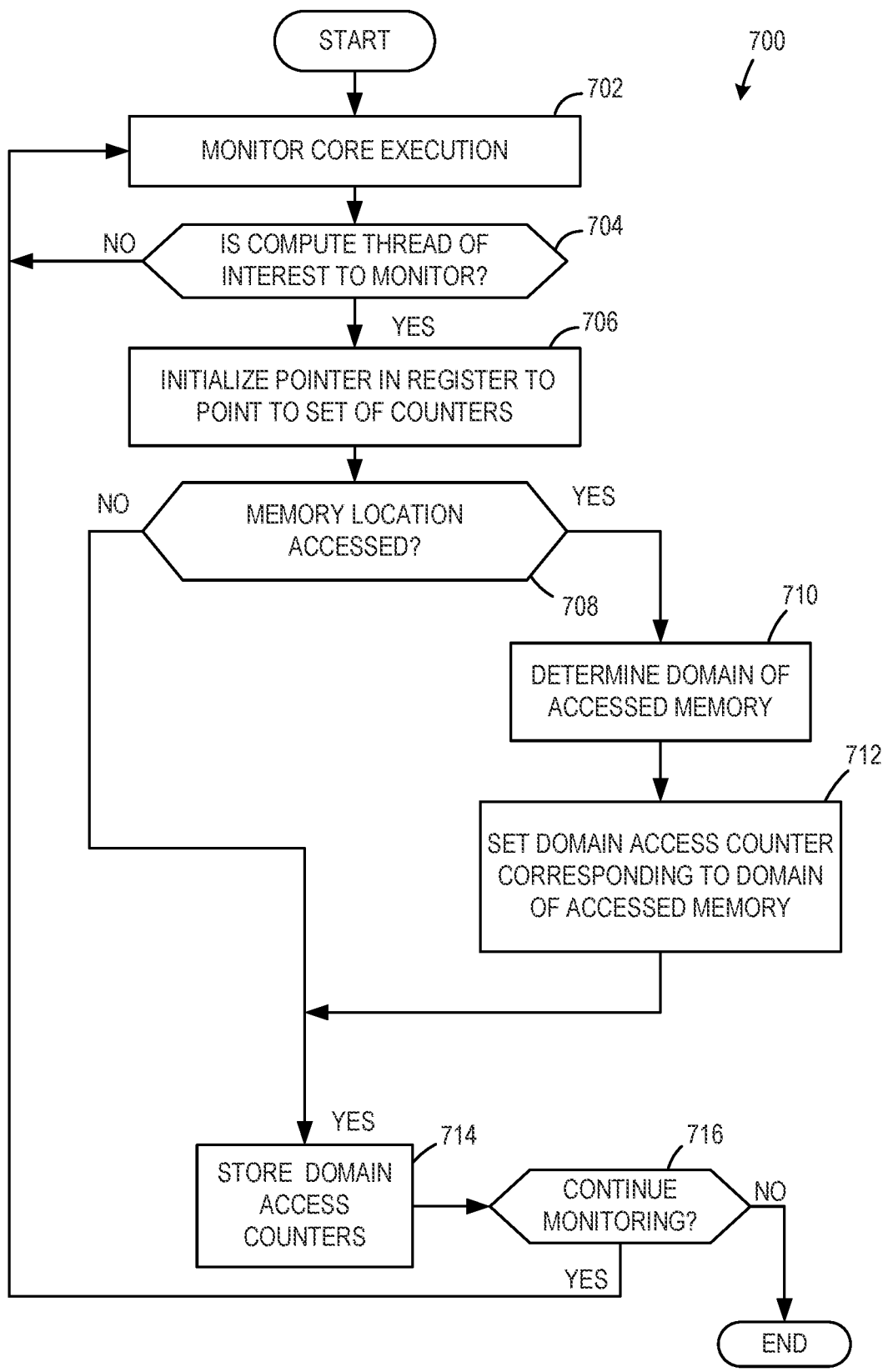

FIG. 7 is a flowchart representative of example machine readable instructions and/or example operations 700 that may be executed and/or instantiated by processor circuitry to cause the example task relocation controller 104 (FIGS. 1 and 2) to set (e.g., update, increment) a count value in a domain access counter (e.g., one of the domain access counters 220, 222, 224, 226) in response to a compute thread accessing a memory location of a compute-memory domain (e.g., one of the compute-memory domains 106a-d) corresponding to that domain access counter. The machine readable instructions and/or operations 700 of FIG. 7 begin at block 702, at which the example execution monitor 204 (FIG. 2) monitors core execution. For example, the example execution monitor 204 may monitor core execution to detect a compute thread that performs memory accesses.

At block 704, the example thread selection controller 208 (FIG. 2) determines if a detected compute thread is a thread of interest. For example, the thread selection controller 208 may determine a compute thread is not a thread of interest (e.g., "NO") by determining either that an amount of memory accesses performed by that compute thread does not satisfy a threshold (e.g., the number of memory accesses is less than one gigabyte of accessed data) or that the status of the compute thread is a non-HPC thread. If the thread selection controller 208 determines block 704 that the compute thread is not of interest, control returns back to block 702 to continue monitoring the core execution. Alternatively, the example thread selection controller 208 may determine that the detected compute thread is a thread of interest (e.g., "YES") by determining either that an amount of memory accesses performed by that compute thread satisfies a threshold (e.g., the number of memory accesses is more than one gigabyte of accessed data) or the status of the thread is a HPC thread. If the thread selection controller 208 determines at block 704 that the compute thread is of interest, control advances to block 706.

At block 706, the example control circuitry 202 initializes a pointer register 206 (FIG. 2) to point to a set of domain access counters. For example, the example control circuitry 202 may initialize the pointer register 206 to point to the domain access counters 220, 222, 224, 226 (FIG. 2) by loading a memory address in the pointer register 206 corresponding to a memory location in the reserved memory area 218 that stores the example first domain access counter 220, the example second domain access counter 222, the example third domain access counter 224, and the example fourth domain access counter 226. In some examples, the example domain access counters 220, 222, 224, 226 are loaded and maintained in one or more registers.

At block 708, the example execution monitor 204 determines if the compute thread has accessed a memory location. For example, in response to the example execution monitor 204 determining that a memory location is accessed by the compute thread (e.g., "YES"), control advances to block 712. Alternatively, in response to the example execution monitor 204 determining that a memory location is not accessed by the compute thread (e.g., "NO"), control advances to block 714.

At block 710, the example execution monitor 204 determines the compute-memory domain of the accessed memory location. For example, the example execution monitor 204 may identify one of the compute-memory domains 220, 222, 224, 226 that corresponds to the accessed memory location by using a lookup table that maps memory addresses to the compute-memory domains 220, 222, 224, 226.

At block 712, the example execution monitor 204 increments a memory access counter corresponding to the compute-memory domain of the accessed memory. For example, the execution monitor 204 sets (e.g., updates, increments) a count value in a domain access counter that corresponds to the one of the compute-memory domains 220, 222, 224, 226 that includes the memory location accessed at block 708. For example, the example execution monitor 204 may set (e.g., update, increment) a count value in the first domain access counter 220 associated with the first compute-memory domain 106a if the accessed memory location is in one of the local memories 116a, 118a of the first compute-memory domain 106a.

At block 714, the example control circuitry 202 stores domain access counters. For example, the example control circuitry 202 may store the states of the example first domain access counter 220, the example second domain access counter 222, the example third domain access counter 224, and the example fourth domain access counter 226 in a separate memory (e.g., a system memory) when monitoring of a compute thread is halted. For example, the example control circuitry 202 may store the states of the domain access counters 220, 222, 224, 226 during a thread/task context switch in which a compute thread is stopped/paused and another compute thread is executed. Alternatively, the states of domain access counters can be maintained in the reserved memory area 218 if the size of the reserved memory area 218 is large enough to maintain multiple sets of domain accessed counters instantiated for multiple compute threads.

At block 716, the example execution monitor 204 determines whether to continue monitoring compute threads. For example, the example execution monitor 204 may determine to continue monitoring compute threads (e.g., "YES") based on one or more of the cores 102a-d continuing to execute instructions. If the example execution monitor 204 determines at block 716 to continue monitoring compute threads, control returns to block 702, to continue monitoring the core execution. Alternatively, the example execution monitor 204 may determine to not continue monitoring the compute threads (e.g., "NO") if, for example, the cores 102a-d are no longer executing instructions. The example instructions 700 end.

Figure 8:
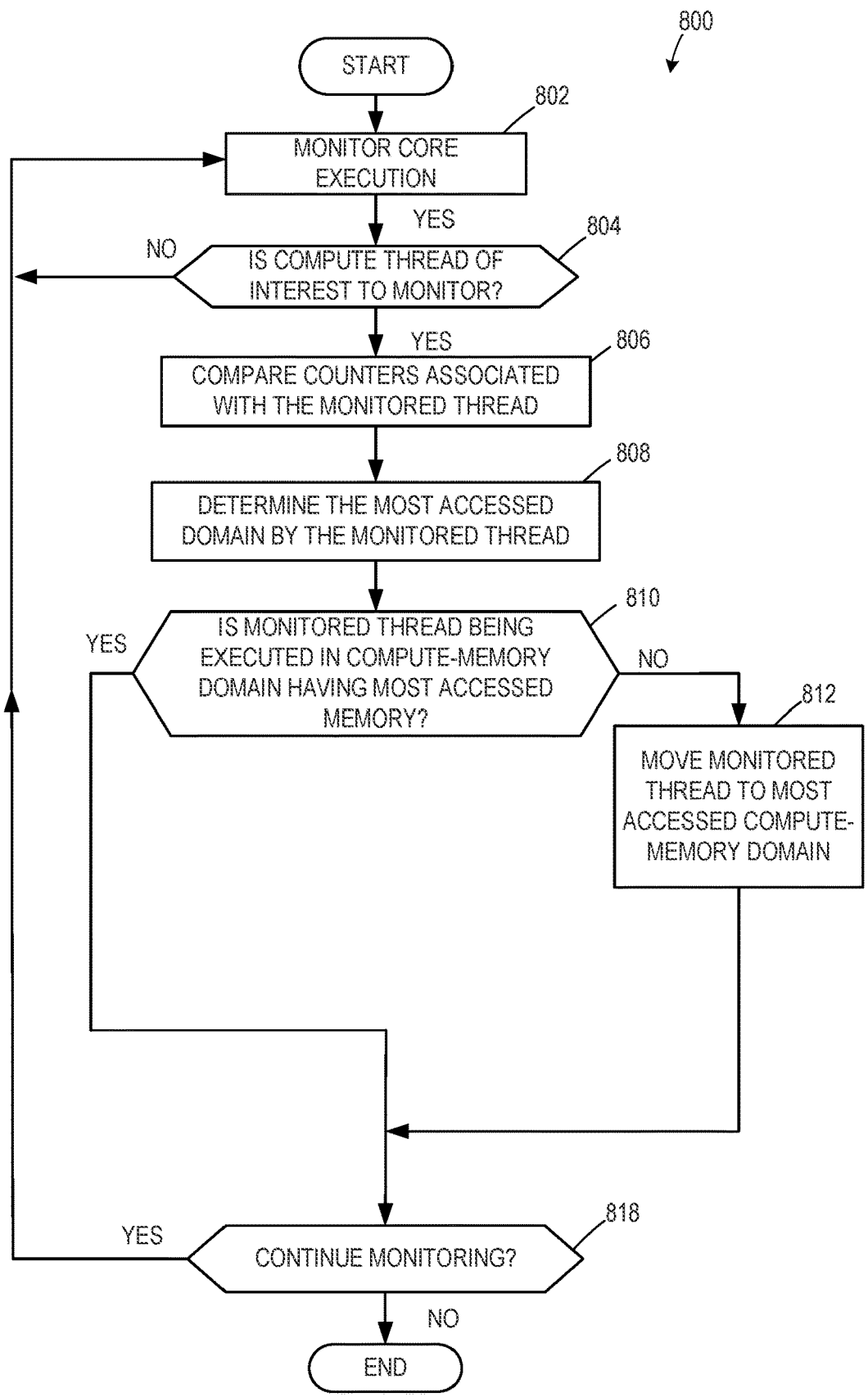

FIG. 8 is a flowchart representative of example machine readable instructions and/or example operations 800 that may be executed and/or instantiated by processor circuitry to move compute threads between different memory-compute domains. The machine readable instructions and/or operations 800 of FIG. 8 begin at block 802, at which the execution monitor 204 (FIG. 2) monitors core execution of the cores 102a-d (FIGS. 1 and 2). For example, the example execution monitor 204 may monitor core execution to detect a compute thread that performs memory accesses.

At block 804, the example thread selection controller 208 determines if a detected compute thread is a thread of interest. For example, the thread selection controller 208 may determine a compute thread is not a thread of interest (e.g., "NO") by determining that an amount of memory accesses performed by that compute thread does not satisfy a threshold (e.g., the number of memory accesses is less than one gigabyte of accessed data), the compute thread is a non-HPC thread, and/or that the compute thread is not selected for monitoring by a user. If the thread selection controller 208 determines at block 804 that the compute thread is not of interest, control returns to block 802 to continue monitoring the core execution. Alternatively, the example thread selection controller 208 may determine that the detected compute thread is a thread of interest (e.g., "YES") by determining that an amount of memory accesses performed by that compute thread satisfies a threshold (e.g., the number of memory accesses is more than one gigabyte of accessed data), determining the thread is a HPC thread, and/or determining the compute thread is selected for monitoring by a user.

At block 806, the example execution monitor 204 compares domain access counters 220, 222, 224, 226 associated with the example compute thread. For example, the example execution monitor 204 may compare count values across the domain access counters 220, 222, 224, 226 associated with the compute thread based on values (e.g., integer values) stored in the example first domain access counter 220, the example second domain access counter 222, the example third domain access counter 224, and the example fourth domain access counter 226.

At block 808, the example execution monitor 204 determines the most-accessed compute-memory domain. For example, the example execution monitor 204 may determine the most-accessed ones of the compute-memory domains 106a-d by identifying the example domain access counters 220, 222, 224, 226 having the largest integer value, and selecting the compute-memory domain 106a-d that corresponds to that identified domain access counter. For example, if the example first domain access counter 220 stores a value representing ten (10) memory accesses for the first compute-memory domain 106a (e.g., the ten (10) memory accesses including seven (7) memory accesses to a first local memory "0" 116a and three (3) memory accesses to a second local memory "1" 118a), and the example second domain access counter 222 stores a value representing twelve (12) memory accesses for the second compute-memory domain 106b, the example execution monitor 204 determines that the example second compute-memory domain 106b is the most-accessed compute-memory domain.

At block 810, the example execution monitor 204 determines if the compute thread is being executed in the compute-memory domain that is closest to the most-accessed memory. For example, the example execution monitor 204 may determine the compute thread is being executed in one of the compute-memory domains 106a-d that is closest to the most-accessed memory by comparing the memory address range of the compute-memory domain executing the compute thread, and the memory address range of the compute-memory domain of the most-accessed memory to find a match. If the example execution monitor 204 determines at block 810 that the compute thread is being executed in the compute-memory domain closest to the most-accessed memory (e.g., "YES"), control advances to block 818. If the example execution monitor 204 determines at block 810 that the compute thread is not being executed in the compute-memory domain closest to the most-accessed memory (e.g., "NO"), control advances to block 812.

At block 812, in response to the compute thread not being executed in the compute-memory domain closest to the most-accessed memory, the example execution monitor 204 moves the compute thread to the compute-memory domain in which the most-accessed memory is located. For example, the example execution monitor 204 may include machine readable instructions of the compute thread from a source instruction buffer of a source core 102a-d where the compute thread was being executed to a destination instruction buffer of a destination core 102a-d where the compute thread is to be executed so that the compute thread operates in the compute-memory domain in which the most-accessed memory is located. In this manner, the example core 102a-d in the compute-memory domain 106a-d to which the compute thread was moved can execute the compute thread so that most of the memory accesses performed by that compute thread result in lower memory access latencies by accessing local memory in that same compute-memory domain 106a-d.

At block 818, the example execution monitor 204 determines whether to continue monitoring the plurality of compute threads. If the example execution monitor 204 determines at block 818 to continue monitoring (e.g., "YES"), control returns to block 802. If the example execution monitor 204 determines at block 818 not to continue monitoring, the example instructions 800 end.

Figure 9:
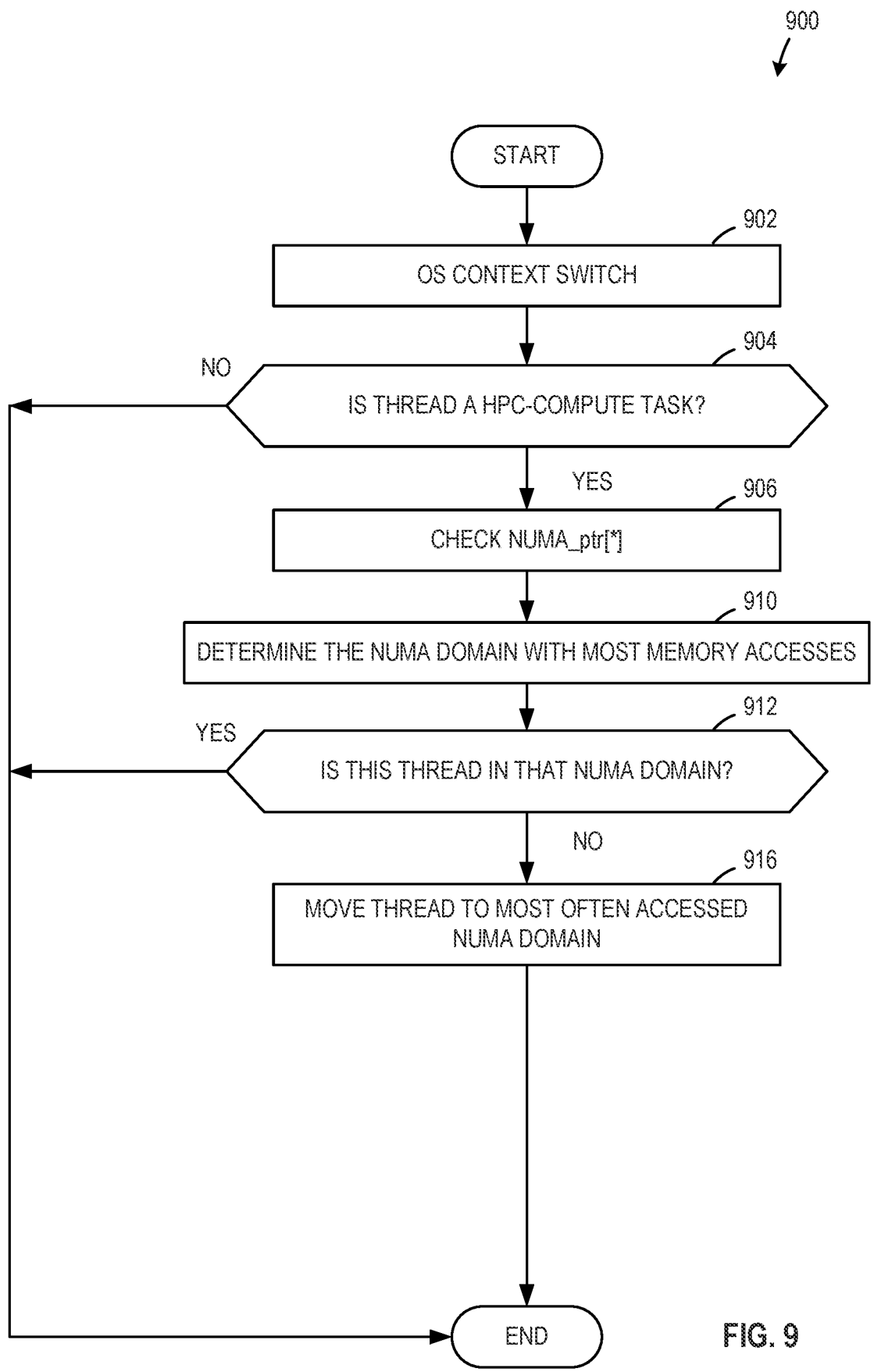

FIG. 9 is a flowchart representative of example machine readable instructions and/or example operations 900 that may be executed and/or instantiated by processor circuitry to move compute threads between memory-compute domains. FIG. 9 is described in the context of non-uniform memory access (NUMA) domains, but the machine readable instructions represented by FIG. 9 may be implemented with any other suitable type of compute-memory domain. The machine readable instructions and/or operations 900 of FIG. 9 begin at block 902, at which the example control circuitry 202 (FIG. 2) completes an operating system (OS) context switch. For example, the example control circuitry 202 communicates with the operating system, such that the operating system is aware of the capabilities to move compute threads to different compute-memory domains.

At block 904, the example thread selection controller 208 (FIG. 2) determines if the compute thread is a high-performance-computing (HPC) task. If the example thread selection controller 208 determines at block 904 that the compute thread is a non-HPC task (e.g., "NO"), the example instructions end. In some examples, the execution monitor 204 may repeat the instructions of FIG. 9 to monitor other compute threads. If the example thread selection controller 208 determines at block 904 that the compute thread is an HPC task (e.g., "YES"), control advances to block 906.

At block 906, the example execution monitor 204 (FIG. 2) checks the example pointer register 206 (FIG. 2). For example, the example execution monitor 204 may check the example pointer register 206 (e.g., "NUMA_ptr[*]") by performing a read operation on the example pointer register 206. The example execution monitor 204 checks the example pointer register 206 to obtain a memory address of domain access counters in the example reserved memory area 218. The example execution monitor 204 can use the memory address to access the domain access counters (e.g., the example first domain access counter 220, the example second domain access counter 222, the example third domain access counter 224, the example fourth domain access counter 226).

At block 910, the example execution monitor 204 determines the example compute-memory domain (e.g., NUMA domain) with the most memory accesses. For example, the example execution monitor 204 may determine the most-accessed compute-memory domain (e.g., a first compute-memory domain 106a) by determining the greatest integer value of the example domain access counters, and selecting the compute-memory domain that corresponds to that domain access counter. For example, if the example first domain access counter 220 stores a value representing ten (10) memory accesses for a first compute-memory domain 106a (e.g., the ten (10) memory accesses including seven (7)

memory accesses to a first local memory "0" 116a and three (3) memory accesses to a second local memory "1" 118a) and the example second domain access counter 222 stores a value representing twelve (12) memory accesses for a second compute-memory domain 106b, the example execution monitor 204 determines that the example second compute-memory domain 106b is the most-accessed compute-memory domain. Control flows to block 912.

At block 912, the example execution monitor 204 determines if the compute thread is being executed in the compute-memory domain with the most-accessed memory. For example, the example execution monitor 204 may determine the compute thread is being executed in the compute-memory domain closest to the most-accessed memory by comparing the memory address range of the compute-memory domain in which the compute thread is being executed, and the memory address range of the compute-memory domain of the most-accessed memory to find a match between the memory address ranges. If the example execution monitor 204 determines at block 912 the compute thread is being executed in the compute-memory domain with the most-accessed memory (e.g., "YES"), compute task remains in its current compute-memory domain for further execution and the example instructions 900 end. If the example execution monitor 204 determines at block 912 that the compute thread is not being executed in the compute-memory domain with the most-accessed memory (e.g., "NO"), control advances to block 916.

At block 916, in response to the compute thread not being executed in the compute-memory domain with the most-accessed memory, the example execution monitor 204 moves the compute thread to the compute-memory domain (e.g., NUMA domain) with the most-accessed memory. For example, the example execution monitor 204 may machine readable instructions of the compute thread from a source instruction buffer of a source core 102a-d where the compute thread was being executed to destination instruction buffer of a destination core 102a-d where the compute thread is to be executed so that the compute thread operates in the compute-memory domain (e.g., NUMA domain) with the most-accessed memory. In this manner, one of the example cores 102a-d in the one of the compute-memory domains 106a-d to which the compute thread was moved can execute the compute thread so that most of the memory accesses performed by that compute thread result in lower memory access latencies by accessing local memory in that same compute-memory domain 106a-d. The example instructions 900 end. The example instructions 900 of FIG. 9 can be executed any number of times to monitor and/or move any number of compute threads.

Figure 10:
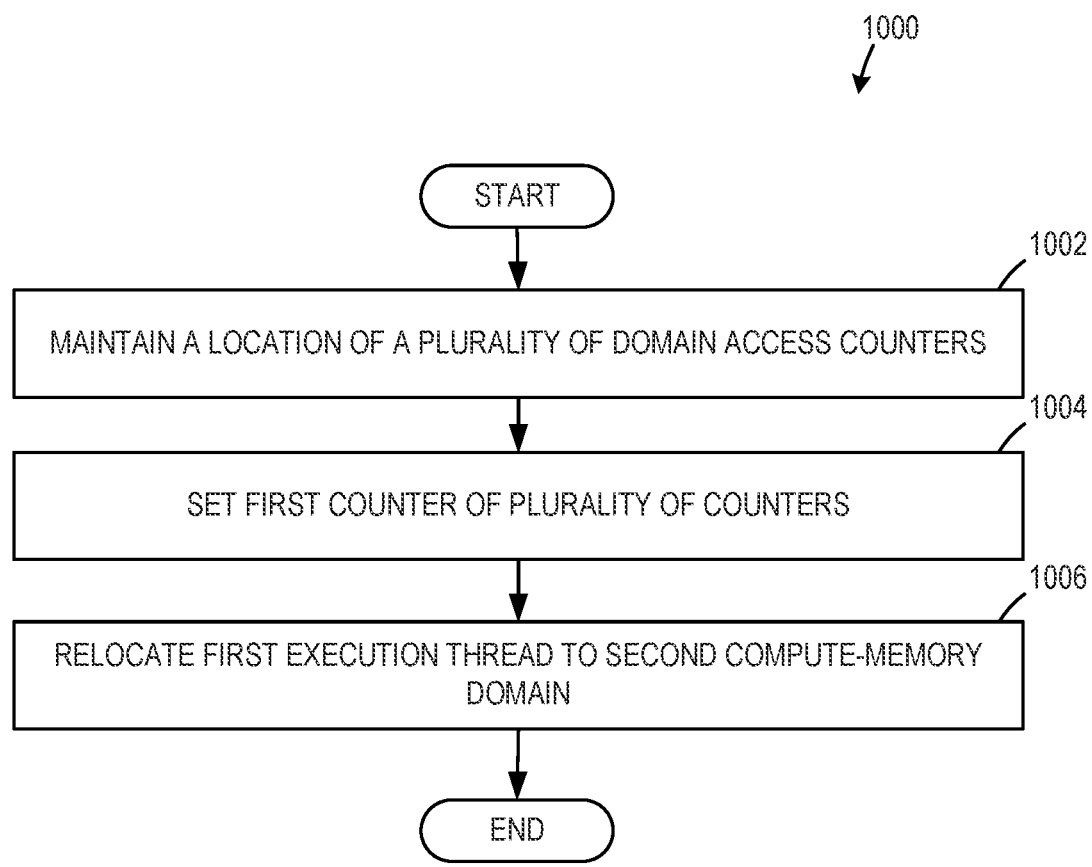

FIG. 10 is a flowchart representative of example machine readable instructions and/or example operations 1000 that may be executed and/or instantiated by processor circuitry to relocate a compute thread between compute-memory domains based on memory accesses. The machine readable instructions and/or operations 1000 of FIG. 10 begin at block 1002 at which the example control circuitry 202 (FIG. 2) maintains a plurality of domain access counters. For example, the example control circuitry 202 may store a memory address value in the pointer register 206 (FIG. 2). For example, the example control circuitry 202 may store the memory address value in the pointer register 206, the address value corresponding to a memory location in the reserved memory area 218, the reserved memory area 218 storing the domain access counters 220, 222, 224, 226 associated with the plurality of compute-memory domains 106a-d for monitoring domain accesses of a compute thread. In some examples, domain access counters 220, 222, 224, 226 may be stored in a register.

At block 1004, the example execution monitor 204 (FIG. 2) sets (e.g., updates, increments) a first domain access counter of the plurality of domain access counters. For example, the example execution monitor 204 may set (e.g., update, increment) a count value in the first domain access counter 220 of the plurality of domain access counters 220, 222, 224, 226, the first domain access counter 220 associated with the first compute-memory domain 106a of the compute-memory domains 106a-d. In such example, the execution monitor 204 sets (e.g., updates, increments) the count value in the first domain access counter 220 based on detecting that memory of the first compute-memory domain 106a is accessed by the compute thread. For example, in response to the execution monitor 204 detecting that memory of the first compute-memory domain 106 is accessed three (3) times by the compute thread, the execution monitor 204 updates a count value in the first domain access counter 220 by a value of three (3).

At block 1006, the example execution monitor 204 relocates the compute thread to a second compute-memory domain of the compute-memory domains in response to a comparison between a second domain access counter associated with the second compute-memory domain and the first domain access counter associated with the first compute-memory domain. For example, the example execution monitor 204 may relocate the compute thread to the second compute-memory domain 106b of the compute-memory domains 106a-d in response to a comparison result of a comparison between a count value of the second domain access counter 222 associated with the second compute-memory domain 106b and a count value of the first domain access counter 220 associated with the first compute-memory domain 106a. In such example, the comparison result is indicative that the second domain access counter 222 includes a higher count value than the first domain access counter 220 to indicate that the compute thread accesses memory in the second compute-memory domain 106b more than memory in the first compute-memory domain 106a such that the compute thread should be executed in the second compute-memory domain 106b to produce lower memory latencies associated with most of its memory accesses. The example instructions 1000 end.

Figure 11:
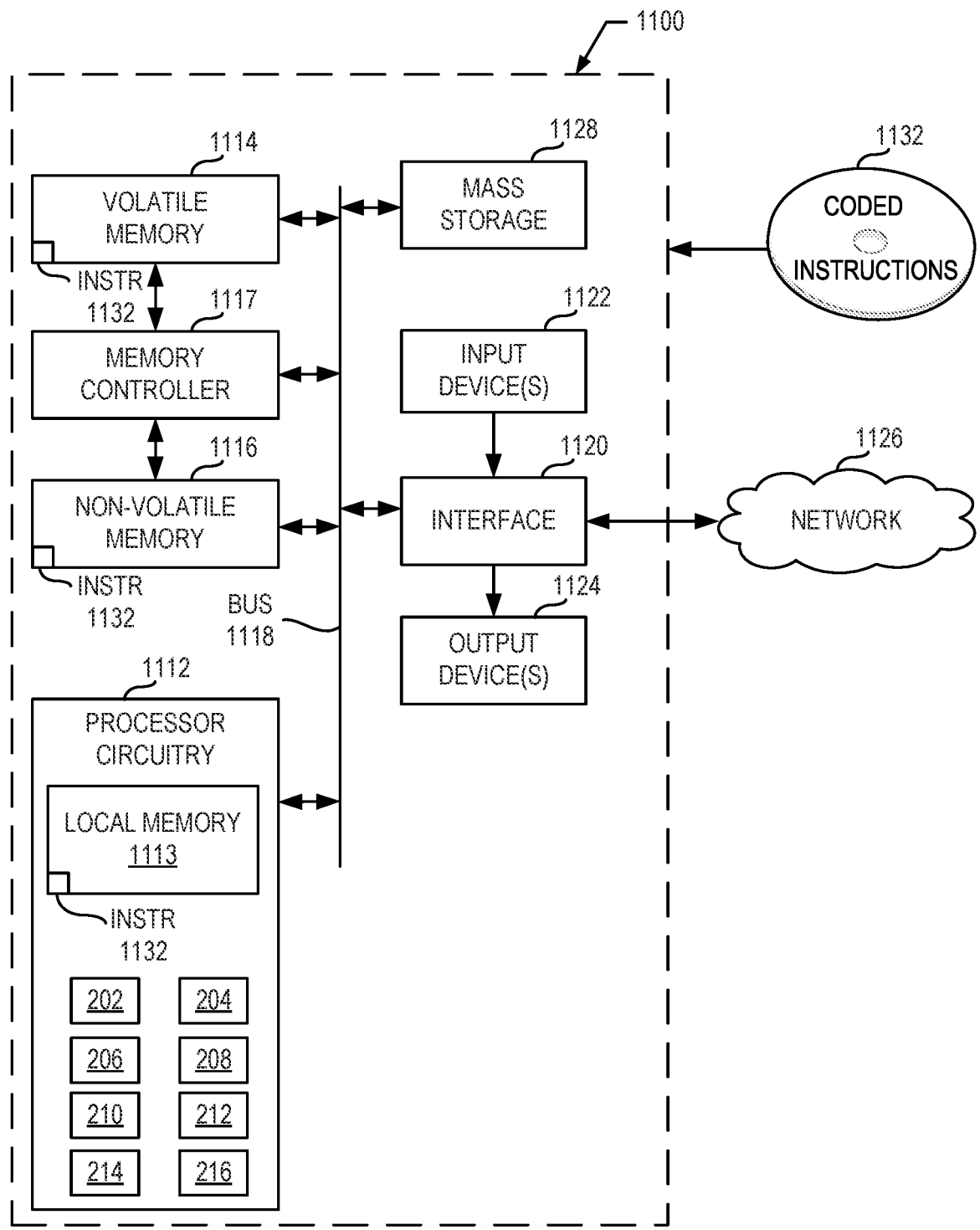
FIG. 11 is a block diagram of an example processing platform including processor circuitry structured to execute the example machine readable instructions of FIGS. 5-10 to implement the example task relocation controller of FIG. 2 to relocate tasks in accordance with teachings of this disclosure.

FIG. 11 is a block diagram of an example processor platform 1100 structured to execute and/or instantiate the machine readable instructions and/or operations of FIGS. 5-10 to implement the task relocation controller 104 of FIG. 2. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the example control circuitry 202, the example execution monitor 204, the example pointer register 206, the example thread selection controller 208, the example BIOS 210, the example cost optimization monitor 212, the example health inspection monitor 214 and the example ACPI distance matrix 216.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output devices 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1132, which may be implemented by the machine readable instructions of FIGS. 5-10, may be stored in the mass storage device 1128, in the volatile memory 1114, in the non-volatile memory 1116, and/or on a removable non-transitory computer readable storage medium such as a CD or DVD.

Figure 12:
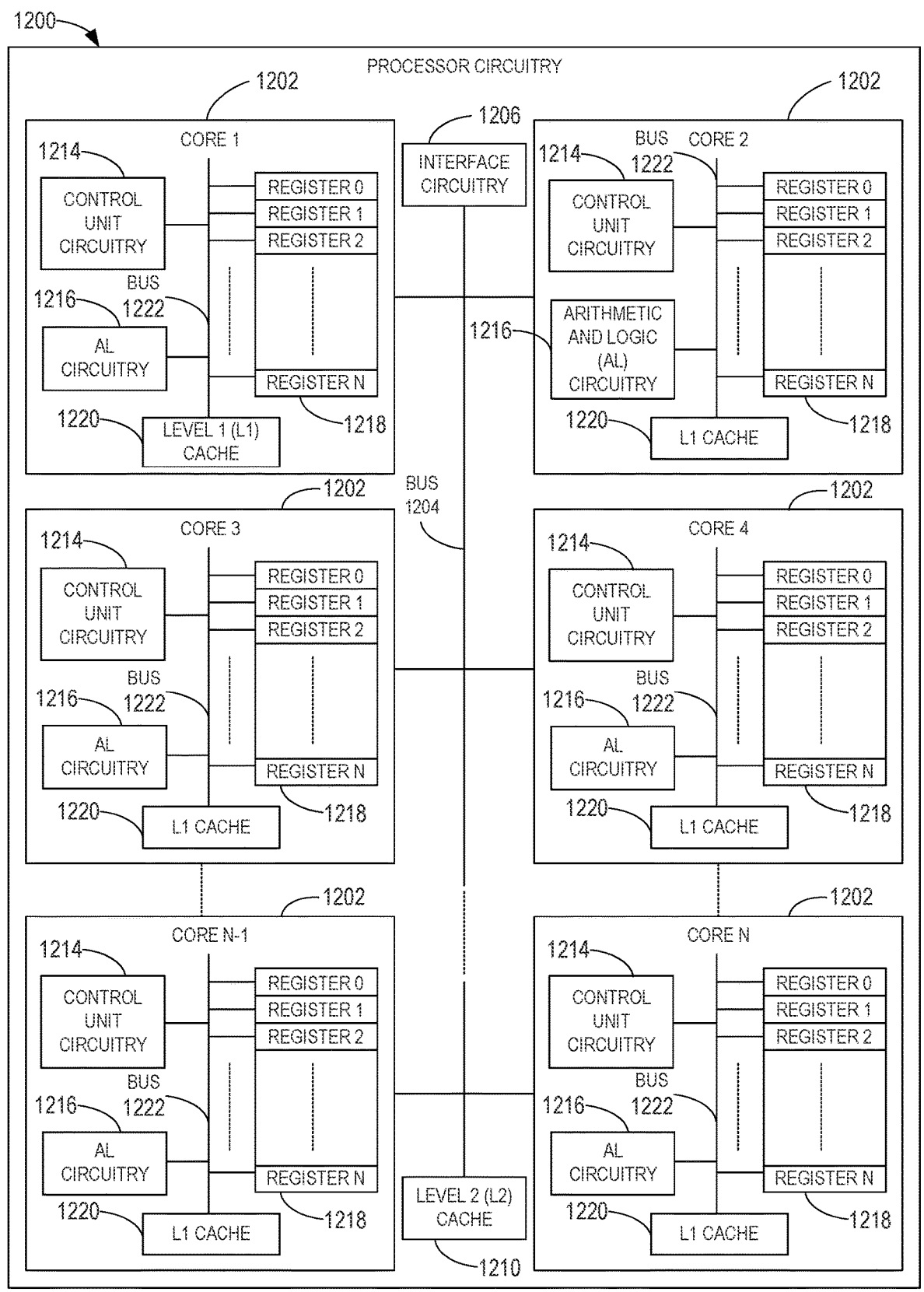
FIG. 12 is a block diagram of an example implementation of the processor circuitry of FIG. 11.

FIG. 12 is a block diagram of an example implementation of the processor circuitry 1112 of FIG. 11. In this example, the processor circuitry 1112 of FIG. 11 is implemented by a microprocessor 1200. For example, the microprocessor 1200 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowchart of FIGS. 5-10.

The cores 1202 may communicate by an example first bus 1204. In some examples, the first bus 1204 may implement a communication bus to effectuate communication associated with one(s) of the cores 1202. For example, the first bus 1204 may implement at least one of an Inter-Integrated Circuit (I2C) bus, a Serial Peripheral Interface (SPI) bus, a PCI bus, or a PCIe bus. Additionally or alternatively, the first bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2_cache)) for high-speed access to data and/or instructions. Data and/or instructions may be transferred (e.g., shared) by writing to and/or reading from the shared memory 1210. The local memory 20 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache 1220, and an example second bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The second bus 1222 may implement at least one of an I2C bus, a SPI bus, a PCI bus, or a PCIe bus.

Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
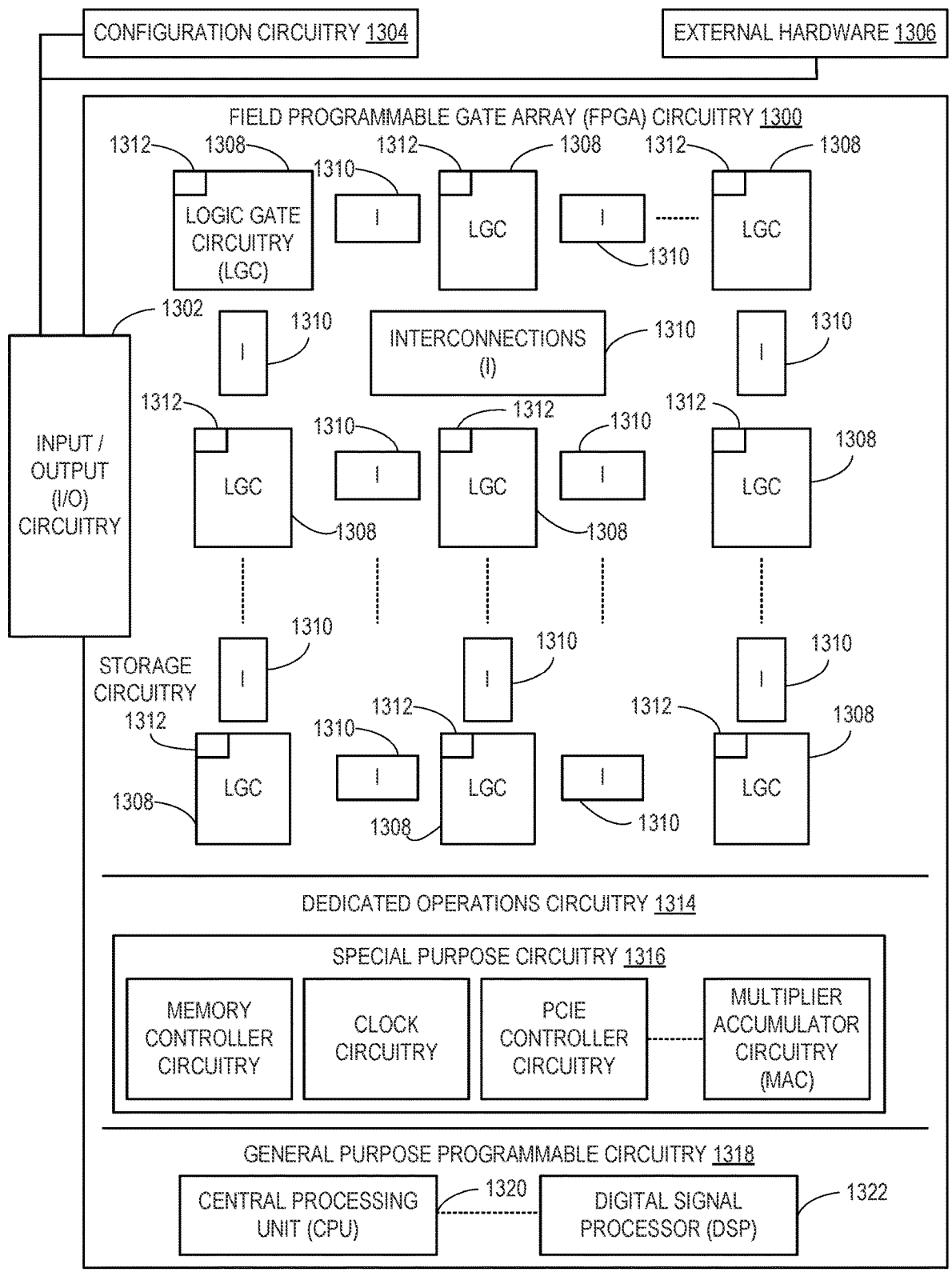
FIG. 13 is a block diagram of another example implementation of the processor circuitry of FIG. 11.

FIG. 13 is a block diagram of another example implementation of the processor circuitry 1112 of FIG. 11. In this example, the processor circuitry 1112 is implemented by FPGA circuitry 1300. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine readable instructions represented by the flowchart of FIG. 10 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowchart of FIG. 10. In particular, the FPGA 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowchart of FIG. 10. As such, the FPGA circuitry 1300 may be structured to effectively instantiate some or all of the machine readable instructions of the flowchart of FIG. 10 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIG. 10 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware (e.g., external hardware circuitry) 1306. For example, the configuration circuitry 1304 may implement interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may implement the microprocessor 1300 of FIG. 13. The FPGA circuitry 1300 also includes an array of example logic gate circuitry 1308, a plurality of example configurable interconnections 1310, and example storage circuitry 1312. The logic gate circuitry 1308 and interconnections 1310 are configurable to instantiate one or more operations that may correspond to at least some of the machine readable instructions of FIG. 10 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1112 of FIG. 11, many other approaches are contemplated. For example, as mentioned above, modern FPGA circuitry may include an on-board CPU, such as one or more of the example CPU 1320 of FIG. 13. Therefore, the processor circuitry 1112 of FIG. 11 may additionally be implemented by combining the example microprocessor 1200 of FIG. 12 and the example FPGA circuitry 1300 of FIG. 13. In some such hybrid examples, a first portion of the machine readable instructions represented by the flowchart of FIG. 10 may be executed by one or more of the cores 1202 of FIG. 12 and a second portion of the machine readable instructions represented by the flowchart of FIG. 10 may be executed by the FPGA circuitry 1300 of FIG. 13.

In some examples, the processor circuitry 1112 of FIG. 11 may be in one or more packages. For example, the processor circuitry 1200 of FIG. 12 and/or the FPGA circuitry 1300 of FIG. 13 may be in one or more packages. In some examples, an XPU may be implemented by the processor circuitry 1112 of FIG. 11, which may be in one or more packages. For example, the XPU may include a CPU in one package, a DSP in another package, a GPU in yet another package, and an FPGA in still yet another package.

Figure 14:
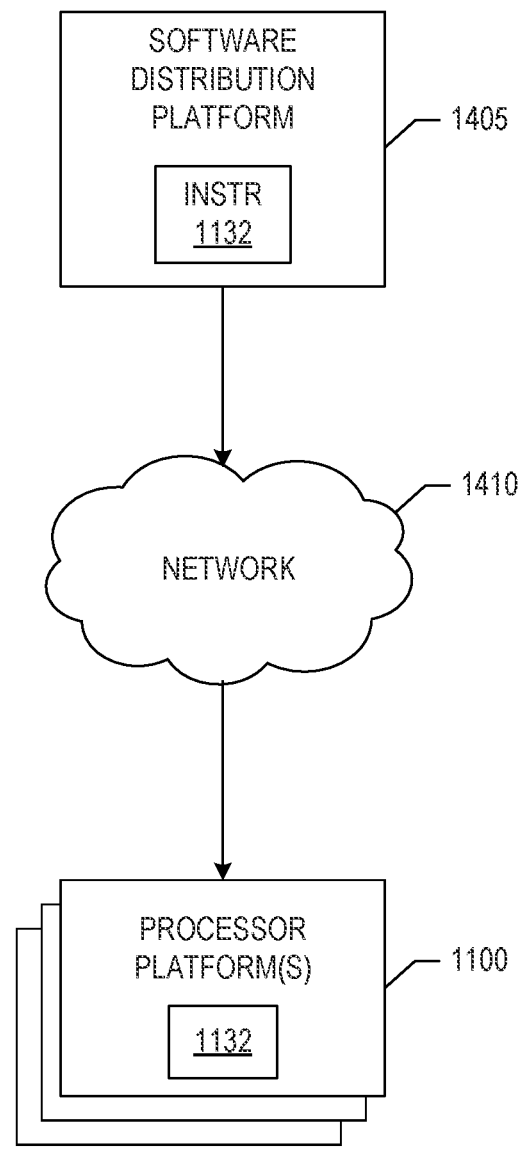
FIG. 14 is a block diagram of an example software distribution platform (e.g., one or more servers) to distribute software (e.g., software corresponding to the example machine readable instructions of FIGS. 5-10) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine readable instructions 1132 of FIG. 11 to hardware devices owned and/or operated by third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine readable instructions 1132, which may correspond to the example machine readable instructions 1132 of FIGS. 11, as described above. The one or more servers of the example software distribution platform 1405 are in communication with a network 1410, which may correspond to any one or more of the Internet and/or any of the example networks 1126 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1405. For example, the software, which may correspond to the example machine readable instructions 1132 of FIG. 11, may be downloaded to the example processor platform 1100, which is to execute the machine readable instructions 1132 to implement the task relocation controller 104. In some example, one or more servers of the software distribution platform 1405 periodically offer, transmit, and/or force updates to the software (e.g., the example machine readable instructions 1132 of FIG. 11) to ensure improvements, patches, updates, etc., are distributed and applied to the software at the end user devices.

From the foregoing, it will be appreciated that example systems, methods, apparatus, and articles of manufacture have been disclosed that relocate tasks (compute threads) based on memory access patterns. The disclosed systems, methods, apparatus, and articles of manufacture improve the efficiency of using a computing device by not increasing the speed of computations by moving the compute thread to the compute-memory domain with the memory location based on memory access patterns. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to perform task relocation based on memory access patterns are disclosed herein. Further examples and combinations thereof include the following:

Example 1 includes an apparatus to relocate a compute thread, the apparatus comprising control circuitry to maintain a location of a plurality of domain access counters associated with a plurality of compute-memory domains for a first compute thread, and an execution monitor to set a first domain access counter of the plurality of domain access counters, the first domain access counter associated with a first compute-memory domain of the compute-memory domains, and relocate the first compute thread to a second compute-memory domain of the compute-memory domains in response to a comparison between a second domain access counter associated with the second compute-memory domain and the first domain access counter.

Example 2 includes the apparatus of example 1, wherein the execution monitor is to set the first domain access counter of the plurality of domain access counters by incrementing the first domain access counter in response to a memory access.

Example 3 includes the apparatus of example 1, wherein the control circuitry is to maintain the location of the plurality of domain access counters associated with the plurality of compute-memory domains for the first compute thread by storing an address value in a register, the address value corresponding to a memory location storing the plurality of domain access counters.

Example 4 includes the apparatus of example 1, wherein the control circuitry is to maintain the location of the plurality of domain access counters associated with the plurality of compute-memory domains for the first compute thread by storing a first address value in a register, the first address value corresponding to a reserved memory area, the reserved memory area including the plurality of domain access counters.

Example 5 includes the apparatus of example 4, wherein the execution monitor is to reset the plurality of domain access counters in the reserved memory area after the first compute thread is relocated to the second compute-memory domain.

Example 6 includes the apparatus of example 4, wherein the execution monitor is to access the first and second domain access counters in the reserved memory area, determine that the second compute-memory domain is a most-accessed compute-memory domain based on count values stored in the first and second domain access counters, the count values pertaining to memory accesses performed by the compute thread in the first and second compute-memory domains, determine whether the first compute thread is being executed in the most-accessed compute-memory domain, and in response to determining that the first compute thread is not being executed in the most-accessed compute-memory domain, relocate the first compute thread to the most-accessed compute-memory domain.

Example 7 includes the apparatus of example 4, wherein the control circuitry is to store a second address value in the register, the second address value corresponding to a second reserved memory area, the second reserved memory area including a second plurality of domain access counters associated with the compute-memory domains for a second compute thread.

Example 8 includes the apparatus of example 7, wherein the control circuitry is to store the second address value in the register based on a task context switch from the first compute thread to the second compute thread.

Example 9 includes the apparatus of example 4, wherein the control circuitry is to determine an amount of memory for instantiating the reserved memory area based on a number of compute-memory domains and a bit length of one of the domain access counters.

Example 10 includes the apparatus of example 9, wherein the bit length of the one of the domain access counters is less than 64 bytes.

Example 11 includes the apparatus of example 1, further including a thread selection controller to select the first compute thread from a plurality of compute threads based on memory accesses by the first compute thread satisfying a threshold amount of memory.

Example 12 includes the apparatus of example 11, wherein the thread selection controller is to select the first compute thread during run-time execution of the first compute thread.

Example 13 includes the apparatus of example 1, further including a cost optimization monitor to evaluate whether to move the first compute thread based on a cost of moving the first compute thread to the second compute-memory domain and a performance benefit of the first compute thread operating in the second compute-memory domain.

Example 14 includes the apparatus of example 13, wherein the cost is at least one of power consumption, memory bandwidth, memory latency, or performance time.

Example 15 includes the apparatus of example 14, wherein the cost optimization monitor is to evaluate whether to move the first compute thread based on a history of memory accesses.

Example 16 includes the apparatus of example 15, wherein the execution monitor is to generate the history of memory accesses for a first epoch of time for the first compute thread and for a second epoch of time for the first compute thread.

Example 17 includes the apparatus of example 16, wherein the cost optimization monitor includes machine learning circuitry to evaluate the history of memory accesses for the first and second epochs of time.

Example 18 includes the apparatus of example 1, wherein the first compute-memory domain is one of memory in circuit with an accelerator, pooled memory in circuit with a peripheral component interconnect (PCI) bus, or a non-uniform memory access (NUMA) domain.

Example 19 includes the apparatus of example 1, further including a basic input output system (BIOS) including an advanced configuration and power interface (ACPI) distance matrix, and a cost optimization monitor to determine whether to relocate the first compute thread based on a memory access latency associated with the second compute-memory domain specified in the ACPI distance matrix.

Example 20 includes the apparatus of example 1, further including a health inspection monitor to determine whether to move the first compute thread based on whether a core of the second compute-memory domain is faulty.

Example 21 includes the apparatus of example 1, wherein the execution monitor is to determine whether the first compute thread is being executed in a most-accessed compute-memory domain in response to a context switch or an interrupt.

Example 22 includes a non-transitory computer readable medium comprising instructions that, when executed, cause processor circuitry to at least maintain a location of a plurality of domain access counters associated with a plurality of compute-memory domains for a first compute thread, set a first domain access counter of the plurality of domain access counters, the first domain access counter associated with a first compute-memory domain of the compute-memory domains, and relocate the first compute thread to a second compute-memory domain of the compute-memory domains in response to a comparison between a second domain access counter associated with the second compute-memory domain and the first domain access counter.

Example 23 includes the non-transitory computer readable medium of example 22, wherein the instructions are to cause the processor circuitry to set the first domain access counter of the plurality of domain access counters by incrementing the first domain access counter in response to a memory access.

Example 24 includes the non-transitory computer readable medium of example 22, wherein the instructions are to cause the processor circuitry to maintain the location of the plurality of domain access counters associated with the plurality of compute-memory domains for the first compute thread by storing an address value in a register, the address value corresponding to a memory location storing the plurality of domain access counters.

Example 25 includes the non-transitory computer readable medium of example 22, wherein the instructions are to cause the processor circuitry to maintain the location of the plurality of domain access counters associated with the plurality of compute-memory domains for the first compute thread by storing a first address value in a register, the first address value corresponding to a reserved memory area, the reserved memory area including the plurality of domain access counters.

Example 26 includes the non-transitory computer readable medium of example 25, wherein the instructions are to cause the processor circuitry to reset the plurality of domain access counters in the reserved memory area after the first compute thread is relocated to the second compute-memory domain.

Example 27 includes the non-transitory computer readable medium of example 25, wherein the instructions are to cause the processor circuitry to access the first and second domain access counters in the reserved memory area, determine that the second compute-memory domain is a most-accessed compute-memory domain based on count values stored in the first and second domain access counters, the count values pertaining to memory accesses performed by the compute thread in the first and second compute-memory domains, determine whether the first compute thread is being executed in the most-accessed compute-memory domain, and in response to determining that the first compute thread is not being executed in the most-accessed compute-memory domain, relocate the first compute thread to the most-accessed compute-memory domain.

Example 28 includes the non-transitory computer readable medium of example 27, wherein the instructions are to cause the processor circuitry to store a second address value in the register, the second address value corresponding to a second reserved memory area, the second reserved memory area including a second plurality of domain access counters associated with the compute-memory domains for a second compute thread.

Example 29 includes the non-transitory computer readable medium of example 25, wherein the instructions are to cause the processor circuitry to store the second address value in the register based on a task context switch from the first compute thread to the second compute thread.

Example 30 includes the non-transitory computer readable medium of example 25, wherein the instructions are to cause the processor circuitry to determine an amount of memory for instantiating the reserved memory area based on a number of compute-memory domains and a bit length of one of the domain access counters.

Example 31 includes the non-transitory computer readable medium of example 30, wherein the bit length of the one of the domain access counters is less than 64 bytes.

Example 32 includes the non-transitory computer readable medium of example 22, wherein the instructions are to cause the processor circuitry to select the first compute thread from a plurality of compute threads based on memory accesses by the first compute thread satisfying a threshold amount of memory.

Example 33 includes the non-transitory computer readable medium of example 32, wherein the instructions are to cause the processor circuitry to select the first compute thread during run-time execution of the first compute thread.

Example 34 includes the non-transitory computer readable medium of example 22, wherein the instructions are to cause the processor circuitry to evaluate whether to move the first compute thread based on a cost of moving the first compute thread to the second compute-memory domain and a performance benefit of the first compute thread operating in the second compute-memory domain.

Example 35 includes the non-transitory computer readable medium of example 34, wherein the cost is at least one of power consumption, memory bandwidth, memory latency, or performance time.

Example 36 includes the non-transitory computer readable medium of example 35, wherein the instructions are to cause the processor circuitry to evaluate whether to move the first compute thread based on a history of memory accesses.

Example 37 includes the non-transitory computer readable medium of example 36, wherein the instructions are to cause the processor circuitry to generate the history of memory accesses for a first epoch of time for the first compute thread and for a second epoch of time for the first compute thread.

Example 38 includes the non-transitory computer readable medium of example 37, wherein the instructions are to cause the processor circuitry to evaluate the history memory accesses for the first and second epochs of time.

Example 39 includes the non-transitory computer readable medium of example 22, wherein the first compute-memory domain is one of memory in circuit with an accelerator, pooled memory in circuit with a peripheral component interconnect (PCI) bus, or a non-uniform memory access (NUMA) domain.

Example 40 includes the non-transitory computer readable medium of example 22, wherein the instructions are to cause the processor circuitry to determine whether to relocate the first compute thread based on a memory access latency associated with the second compute-memory domain specified in an advanced configuration and power interface (ACPI) distance matrix, the ACPI distance matrix located in a basic input output system (BIOS).

Example 41 includes the non-transitory computer readable medium of example 22, wherein the instructions are to cause the processor circuitry to determine whether to move the first compute thread based on whether a core of the second compute-memory domain is faulty.

Example 42 includes the non-transitory computer readable medium of example 22, wherein the instructions are to cause the processor circuitry to determine whether the first compute thread is being executed in a most-accessed compute-memory domain in response to a context switch or an interrupt.

Example 43 includes an apparatus comprising instructions in the apparatus, and processor circuitry including control circuitry to control data movement within the processor circuitry, arithmetic and logic circuitry to perform one or more operations on the data, and one or more registers to store a result of one or more operations, the processor circuitry to execute the instructions to maintain a location of a plurality of domain access counters associated with a plurality of compute-memory domains for a first compute thread, set a first domain access counter of the plurality of domain access counters, the first domain access counter associated with a first compute-memory domain of the compute-memory domains, and relocate the first compute thread to a second compute-memory domain of the compute-memory domains in response to a comparison between a second domain access counter associated with the second compute-memory domain and the first domain access counter.

Example 44 includes the apparatus of example 43, wherein the processor circuitry is to execute the instructions to set the first domain access counter of the plurality of domain access counters by incrementing the first domain access counter in response to a memory access.

Example 45 includes the apparatus of example 43, wherein the processor circuitry is to execute the instructions to maintain the location of the plurality of domain access counters associated with the plurality of compute-memory domains for the first compute thread by storing an address value in a register, the address value corresponding to a memory location storing the plurality of domain access counters.

Example 46 includes the apparatus of example 43, wherein the processor circuitry is to execute the instructions to maintain the location of the plurality of domain access counters associated with the plurality of compute-memory domains for the first compute thread by storing a first address value in a register, the first address value corresponding to a reserved memory area, the reserved memory area including the plurality of domain access counters.

Example 47 includes the apparatus of example 46, wherein the processor circuitry is to execute the instructions to reset the plurality of domain access counters in the reserved memory area after the first compute thread is relocated to the second compute-memory domain.

Example 48 includes the apparatus of example 46, wherein the processor circuitry is to execute the instructions to access the first and second domain access counters in the reserved memory area, determine that the second compute-memory domain is a most-accessed compute-memory domain based on count values stored in the first and second domain access counters, the count values pertaining to memory accesses performed by the compute thread in the first and second compute-memory domains, determine whether the first compute thread is being executed in the most-accessed compute-memory domain, and in response to determining that the first compute thread is not being executed in the most-accessed compute-memory domain, relocate the first compute thread to the most-accessed compute-memory domain.

Example 49 includes the apparatus of example 46, wherein the processor circuitry is to execute the instructions to store a second address value in the register, the second address value corresponding to a second reserved memory area, the second reserved memory area including a second plurality of domain access counters associated with the compute-memory domains for a second compute thread.

Example 50 includes the apparatus of example 49, wherein the processor circuitry is to execute the instructions to store the second address value in the register based on a task context switch from the first compute thread to the second compute thread.

Example 51 includes the apparatus of example 46, wherein, the processor circuitry is to determine an amount of memory for instantiating the reserved memory area based on a number of compute-memory domains and a bit length of one of the domain access counters.

Example 52 includes the apparatus of example 51, wherein the bit length of the one of the domain access counters is less than 64 bytes.

Example 53 includes the apparatus of example 43, wherein the processor circuitry is to execute the instructions to select the first compute thread from a plurality of compute threads based on memory accesses by the first compute thread satisfying a threshold amount of memory.

Example 54 includes the apparatus of example 53, wherein the processor circuitry is to execute the instructions to select the first compute thread during run-time execution of the first compute thread.

Example 55 includes the apparatus of example 43, wherein the processor circuitry is to execute the instructions to evaluate whether to move the first compute thread based on a cost of moving the first compute thread to the second compute-memory domain and a performance benefit of the first compute thread operating in the second compute-memory domain.

Example 56 includes the apparatus of example 55, wherein the cost is at least one of power consumption, memory bandwidth, memory latency, or performance time.

Example 57 includes the apparatus of example 56, wherein the processor circuitry is to execute the instructions to evaluate whether to move the first compute thread based on a history of memory accesses.

Example 58 includes the apparatus of example 57, wherein the processor circuitry is to execute the instructions to generate the history of memory accesses for a first epoch of time for the first compute thread and for a second epoch of time for the first compute thread.

Example 59 includes the apparatus of example 58, wherein the processor circuitry is to execute the instructions to evaluate the history of memory accesses for the first and second epochs of time.

Example 60 includes the apparatus of example 43, wherein the first compute-memory domain is one of memory in circuit with an accelerator, pooled memory in circuit with a peripheral component interconnect (PCI) bus, or a non-uniform memory access (NUMA) domain.

Example 61 includes the apparatus of example 43 wherein the processor circuitry is to execute the instructions to determine whether to relocate the first compute thread based on a memory access latency associated with the second compute-memory domain specified in an advanced configuration and power interface (ACPI) distance matrix, the ACPI distance matrix located in a basic input output system (BIOS).

Example 62 includes the apparatus of example 43 wherein the processor circuitry is to execute the instructions to determine whether to move the first compute thread based on whether a core of the second compute-memory domain is faulty.

Example 63 includes the apparatus of example 43 wherein the processor circuitry is to execute the instructions to determine whether the first compute thread is being executed in a most-accessed compute-memory domain in response to a context switch or an interrupt.

Example 64 includes a method for relocating a compute thread, the method comprising maintain a location of a plurality of domain access counters associated with a plurality of compute-memory domains for a first compute thread, setting a first domain access counter of the plurality of domain access counters, the first domain access counter associated with a first compute-memory domain of the compute-memory domains, and relocating the first compute thread to a second compute-memory domain of the compute-memory domains in response to a comparison between a second domain access counter associated with the second compute-memory domain and the first domain access counter.

Example 65 includes the method of example 64, wherein the setting of the first domain access counter of the plurality of domain access counters includes incrementing the first domain access counter in response to a memory access.

Example 66 includes the method of example 64, wherein the maintaining of the location of the plurality of domain access counters associated with the plurality of compute-memory domains for the first compute thread includes storing an address value in a register, the address value corresponding to a memory location storing the plurality of domain access counters.

Example 67 includes the method of example 64, wherein the maintaining of the location of the plurality of domain access counters associated with the plurality of compute-memory domains for the first compute thread includes storing a first address value in a register, the first address value corresponding to a reserved memory area, the reserved memory area including the plurality of domain access counters.

Example 68 includes the method of example 67, further including resetting the plurality of domain access counters in the reserved memory area after the first compute thread is relocated to the second compute-memory domain.

Example 69 includes the method of example 67, further including accessing the first and second domain access counters in the reserved memory area, determining that the second compute-memory domain is a most-accessed compute-memory domain based on count values stored in the first and second domain access counters, the count values pertaining to memory accesses performed by the compute thread in the first and second compute-memory domains, determining whether the first compute thread is being executed in the most-accessed compute-memory domain, and in response to determining that the first compute thread is not being executed in the most-accessed compute-memory domain, relocating the first compute thread to the most-accessed compute-memory domain.

Example 70 includes the method of example 67, further including storing a second address value in the register, the second address value corresponding to a second reserved memory area, the second reserved memory area including a second plurality of domain access counters associated with the compute-memory domains for a second compute thread.

Example 71 includes the method of example 70, wherein the storing of the second address value in the register is based on a task context switch from the first compute thread to the second compute thread.

Example 72 includes the method of example 71, further including determining an amount of memory for instantiating the reserved memory area based on a number of compute-memory domains and a bit length of one of the domain access counters.

Example 73 includes the method of example 72, wherein the bit length of the one of the domain access counters is less than 64 bytes.

Example 74 includes the method of example 64, further including selecting the first compute thread from a plurality of compute threads based on memory accesses by the first compute thread satisfying a threshold amount of memory.

Example 75 includes the method of example 74, wherein selecting of the first compute thread is during run-time execution of the first compute thread.

Example 76 includes the method of example 64, further including evaluating whether to move the first compute thread based on a cost of moving the first compute thread to the second compute-memory domain and a performance benefit of the first compute thread operating in the second compute-memory domain.

Example 77 includes the method of example 76, wherein the cost is at least one of power consumption, memory bandwidth, memory latency, or performance time.

Example 78 includes the method of example 77, wherein the evaluating of whether to move the first compute thread is based on a history of memory accesses.

Example 79 includes the method of example 78, further including generating the history of memory accesses for a first epoch of time for the first compute thread and for a second epoch of time for the first compute thread.

Example 80 includes the method of example 79, further including evaluating the history of memory accesses for the first and second epochs of time.

Example 81 includes the method of example 64, wherein the first compute-memory domain is one of memory in circuit with an accelerator, pooled memory in circuit with a peripheral component interconnect (PCI) bus, or a non-uniform memory access (NUMA) domain.

Example 82 includes the method of example 64, further including determining whether to relocate the first compute thread based on a memory access latency associated with the second compute-memory domain specified in an advanced configuration and power interface (ACPI) distance matrix, the ACPI distance matrix located in a basic input output system (BIOS).

Example 83 includes the method of example 64, further including determining whether to move the first compute thread based on whether a core of the second compute-memory domain is faulty.

Example 84 includes the method of example 64, further including determining whether the first compute thread is being executed in a most-accessed compute-memory domain in response to a context switch or an interrupt.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to relocate a compute thread, the apparatus comprising:
control circuitry to:
maintain a location of a plurality of domain access counters associated with a plurality of compute-memory domains for a first compute thread; and
determine an amount of memory to instantiate a reserved memory area based on a number of the compute-memory domains and a bit length of at least one of the domain access counters; and
an execution monitor to:
set a first domain access counter of the plurality of domain access counters, the first domain access counter associated with a first compute-memory domain of the compute-memory domains;
when a context switch or an interrupt corresponding to the first compute thread is detected, evaluate execution of the first compute thread by performing a comparison between the first domain access counter and a second domain access counter associated with a second compute-memory domain; and
relocate the first compute thread to the second compute-memory domain after the comparison, the second compute-memory domain including a core, the relocating of the first compute thread to the second compute-memory domain to cause the core to execute the first compute thread.

2. The apparatus of claim 1, wherein the control circuitry is to maintain the location of the plurality of domain access counters associated with the plurality of compute-memory domains for the first compute thread by storing a first address value in a register, the first address value corresponding to the reserved memory area, the reserved memory area including the plurality of domain access counters.

3. The apparatus of claim 2, wherein the execution monitor is to:
   access the first and second domain access counters in the reserved memory area;
   determine that the second compute-memory domain is a most-accessed compute-memory domain based on count values stored in the first and second domain access counters, the count values pertaining to memory accesses performed by the compute thread in the first and second compute-memory domains;
   determine whether the first compute thread is being executed in the most-accessed compute-memory domain; and
   in response to determining that the first compute thread is not being executed in the most-accessed compute-memory domain, relocate the first compute thread to the most-accessed compute-memory domain.

4. The apparatus of claim 1, further including a thread selection controller to select the first compute thread from a plurality of compute threads based on memory accesses by the first compute thread satisfying a threshold amount of memory.

5. The apparatus of claim 4, wherein the thread selection controller is to select the first compute thread during runtime execution of the first compute thread.

6. The apparatus of claim 1, further including a cost optimization monitor to evaluate whether to relocate the first compute thread based on a cost of moving the first compute thread to the second compute-memory domain and a performance benefit of the first compute thread operating in the second compute-memory domain.

7. The apparatus of claim 6, wherein the cost optimization monitor is to evaluate whether to relocate the first compute thread based on a history of memory accesses.

8. The apparatus of claim 7, wherein the execution monitor is to generate the history of memory accesses for a first epoch of time for the first compute thread and for a second epoch of time for the first compute thread.

9. The apparatus of claim 8, wherein the cost optimization monitor includes machine learning circuitry to evaluate the history of memory accesses for the first and second epochs of time.

10. A non-transitory computer readable medium comprising instructions to cause at least one processor circuit to at least:
   maintain a location of a plurality of domain access counters associated with a plurality of compute-memory domains for a first compute thread;
   determine an amount of memory to instantiate a reserved memory area based on a number of the compute-memory domains and a bit length of at least one of the domain access counters;
   set a first domain access counter of the plurality of domain access counters, the first domain access counter associated with a first compute-memory domain of the compute-memory domains;
   after detection of a context switch or an interrupt corresponding to the first compute thread, evaluate execution of the first compute thread by performing a comparison between the first domain access counter and a second domain access counter associated with a second compute-memory domain; and
   relocate the first compute thread to the second compute-memory domain after the comparison, the second compute-memory domain including a core, the relocating of the first compute thread to the second compute-memory domain to cause the core to execute the first compute thread.

11. The non-transitory computer readable medium of claim 10, wherein the instructions are to cause one or more of the at least one processor circuit to set the first domain access counter of the plurality of domain access counters by incrementing the first domain access counter in response to a memory access.

12. The non-transitory computer readable medium of claim 10, wherein the instructions are to cause one or more of the at least one processor circuit to maintain the location of the plurality of domain access counters associated with the plurality of compute-memory domains for the first compute thread by storing a first address value in a register, the first address value corresponding to the reserved memory area, the reserved memory area including the plurality of domain access counters.

13. The non-transitory computer readable medium of claim 12, wherein the instructions are to cause one or more of the at least one processor circuit to:
   access the first and second domain access counters in the reserved memory area;
   determine that the second compute-memory domain is a most-accessed compute-memory domain based on count values stored in the first and second domain access counters, the count values pertaining to memory accesses performed by the compute thread in the first and second compute-memory domains;
   determine whether the first compute thread is being executed in the most-accessed compute-memory domain; and
   in response to determining that the first compute thread is not being executed in the most-accessed compute-memory domain, relocate the first compute thread to the most-accessed compute-memory domain.

14. The non-transitory computer readable medium of claim 10, wherein the instructions are to cause one or more of the at least one processor circuit to evaluate whether to relocate the first compute thread based on a cost of moving the first compute thread to the second compute-memory domain and a performance benefit of the first compute thread operating in the second compute-memory domain.

15. An apparatus comprising:
   machine-readable instructions; and
   at least one processor circuit including control circuitry to control data movement within the at least one processor circuit, arithmetic and logic circuitry to perform one or more operations on the data, and one or more registers to store a result of the one or more operations, the machine-readable instructions to cause the at least one processor circuit to:
      maintain a location of a plurality of domain access counters associated with a plurality of compute-memory domains for a first compute thread;
      determine an amount of memory to instantiate a reserved memory area based on a number of the compute-memory domains and a bit length of at least one of the domain access counters;
      set a first domain access counter of the plurality of domain access counters, the first domain access counter associated with a first compute-memory domain of the compute-memory domains;

after a context switch or an interrupt corresponding to the first compute thread is detected, evaluate execution of the first compute thread by performing a comparison between the first domain access counter and a second domain access counter associated with a second compute-memory domain; and relocate the first compute thread to the second compute-memory domain after the comparison, the second compute-memory domain including a core, the relocating of the first compute thread to the second compute-memory domain to cause the core to execute the first compute thread.

16. The apparatus of claim 15, wherein one or more of the at least one processor circuit is to set the first domain access counter of the plurality of domain access counters by incrementing the first domain access counter in response to a memory access.

17. The apparatus of claim 15, wherein one or more of the at least one processor circuit is to maintain the location of the plurality of domain access counters associated with the plurality of compute-memory domains for the first compute thread by storing a first address value in a register, the first address value corresponding to the reserved memory area, the reserved memory area including the plurality of domain access counters.

18. The apparatus of claim 17, wherein one or more of the at least one processor circuit is to:

access the first and second domain access counters in the reserved memory area;

determine that the second compute-memory domain is a most-accessed compute-memory domain based on count values stored in the first and second domain access counters, the count values pertaining to memory accesses performed by the compute thread in the first and second compute-memory domains;

determine whether the first compute thread is being executed in the most-accessed compute-memory domain; and in response to determining that the first compute thread is not being executed in the most-accessed compute-memory domain, relocate the first compute thread to the most-accessed compute-memory domain.

19. The apparatus of claim 15, wherein one or more of the at least one processor circuit is to evaluate whether to relocate the first compute thread based on a cost of moving the first compute thread to the second compute-memory domain and a performance benefit of the first compute thread operating in the second compute-memory domain.

* * * * *